United States Patent

[11] 3,595,501

| [72] | Inventors | Fred B. Stencel<br>Asheville;<br>Eugene Hensley, Skyland, both of, N.C. |
|---|---|---|
| [21] | Appl. No. | 848,932 |
| [22] | Filed | Aug. 11, 1969 |
| [45] | Patented | July 27, 1971 |
| [73] | Assignee | Stencel Aero Engineering Corporation<br>Arden, N.C.<br>Continuation-in-part of application Ser. No.<br>744,134, July 11, 1968, now abandoned. |

[54] PARACHUTE DEPLOYMENT SYSTEM, INCORPORATING A ROCKET
40 Claims, 36 Drawing Figs.

[52] U.S. Cl. .................................................. 244/142
[51] Int. Cl. .................................................. B64d 17/72
[50] Field of Search.......................................... 244/138, 141, 142, 147, 148, 149, 152; 239/265.15

[56] References Cited
UNITED STATES PATENTS

| 2,751,171 | 6/1956 | Martin | 244/141 |
| 2,823,881 | 2/1958 | Patterson | 244/145 X |
| 3,137,998 | 6/1964 | Beam, Jr. | 239/265.15 X |
| 3,169,003 | 2/1965 | Glass | 239/265.15 X |
| 3,199,814 | 8/1965 | Frieder | 244/145 |
| 3,436,037 | 4/1969 | Stanley | 244/148 X |

Primary Examiner—Milton Buchler
Assistant Examiner—Carl A. Rutledge
Attorney—Roylance, Abrams & Kaul ABSTRACT: A parachute deployment system incorporating a rocket which fires in a downstream direction to extract and deploy the parachute. A pilot parachute means orients the rocket in the downstream direction within the airstream. However, a control means prevents the rocket from igniting until a preselected condition, such as a time lapse, has occurred. When the preselected condition occurs, a release means frees the control means and enables the rocket to ignite, whereupon the rocket will be propelled downstream, thus extracting the parachute from its container and deploying it into the airstream in a downstream direction. Reefing means can be employed to keep the mouth of the parachute canopy reefed until the parachute lines are fully stretched.

INVENTORS.
FRED B. STENCEL
EUGENE HENSLEY

BY Arnold, Roylance,
Kruger & Durkee
ATTORNEYS.

INVENTORS.
FRED B STENCEL
EUGENE HENSLEY

BY Arnold, Roylance,
Kruger & Durkee
ATTORNEYS.

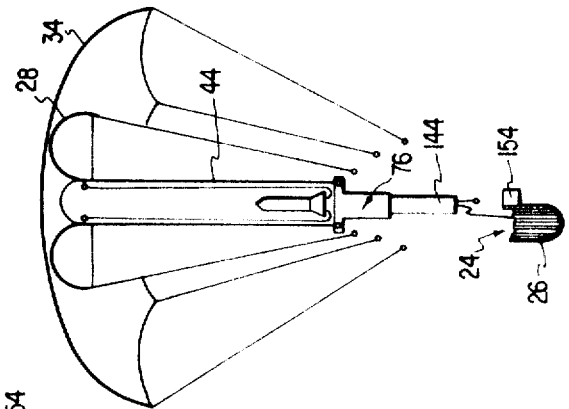
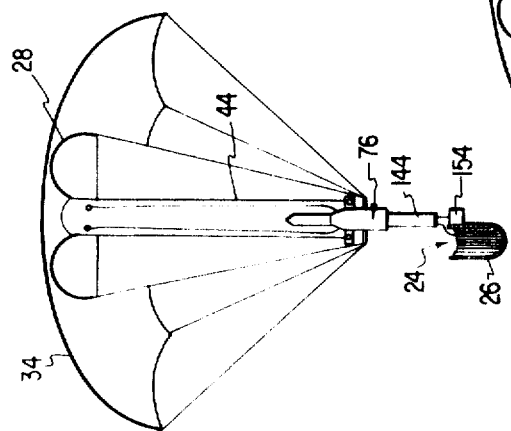
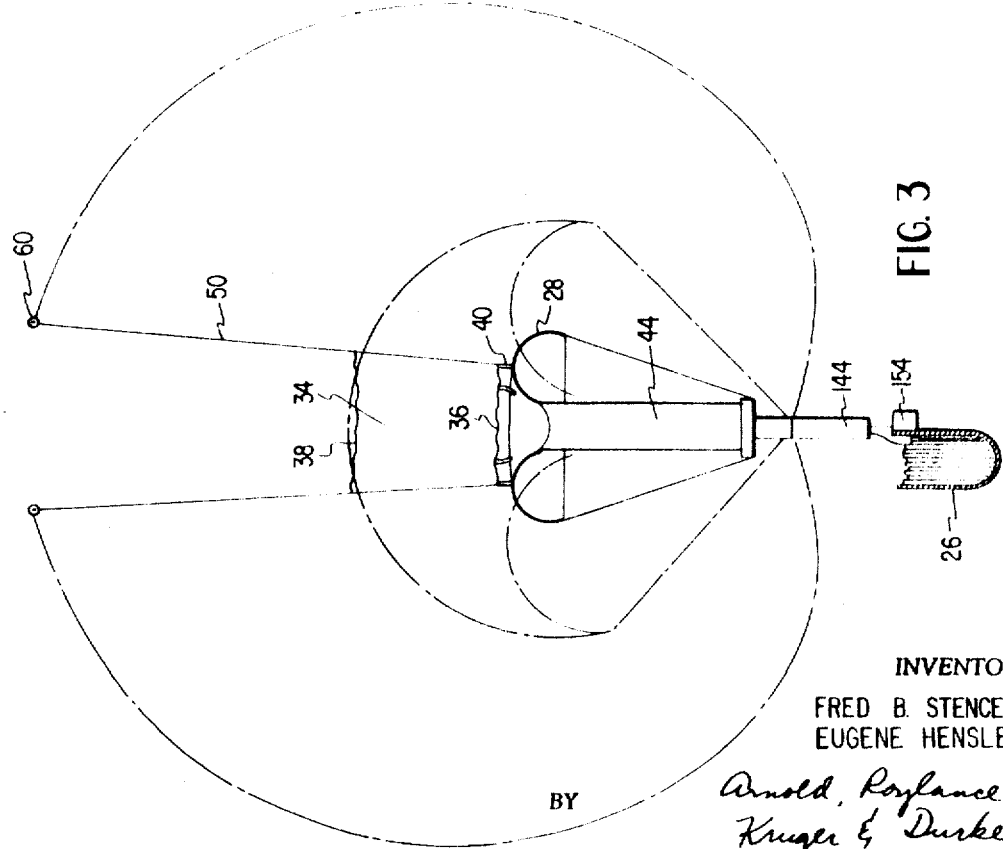
INVENTORS.
FRED B. STENCEL
EUGENE HENSLEY
BY Arnold, Roylance, Kruger & Durkee
ATTORNEYS.

INVENTORS.
FRED B. STENCEL
EUGENE HENSLEY

BY Arnold, Roylance,
Kruger & Durkee
ATTORNEYS.

PATENTED JUL 27 1971 3,595,501
SHEET 05 OF 18
FIG. 8
FIG. 9
FIG. 10
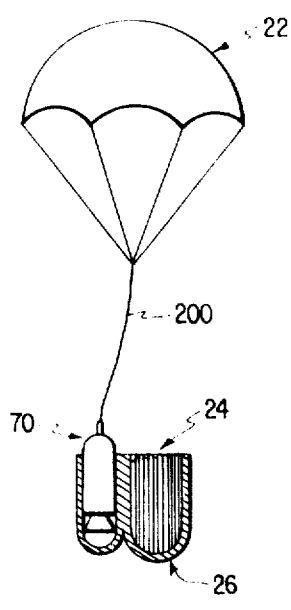
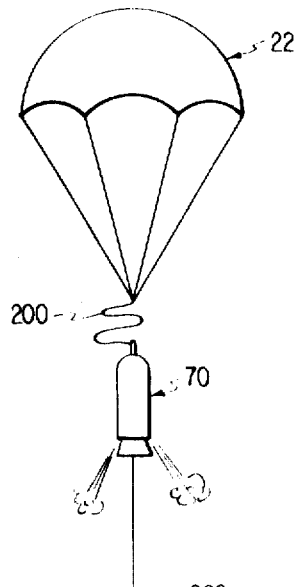
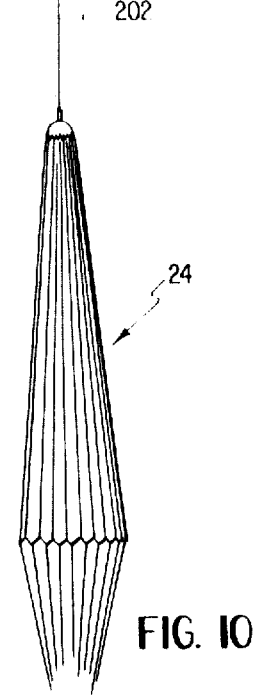
INVENTORS.
FRED B. STENCEL
EUGENE HENSLEY
BY Arnold, Roylance,
Kruger & Durkee
ATTORNEYS PATENTED JUL 27 1971
3,595,501
SHEET 06 OF 18
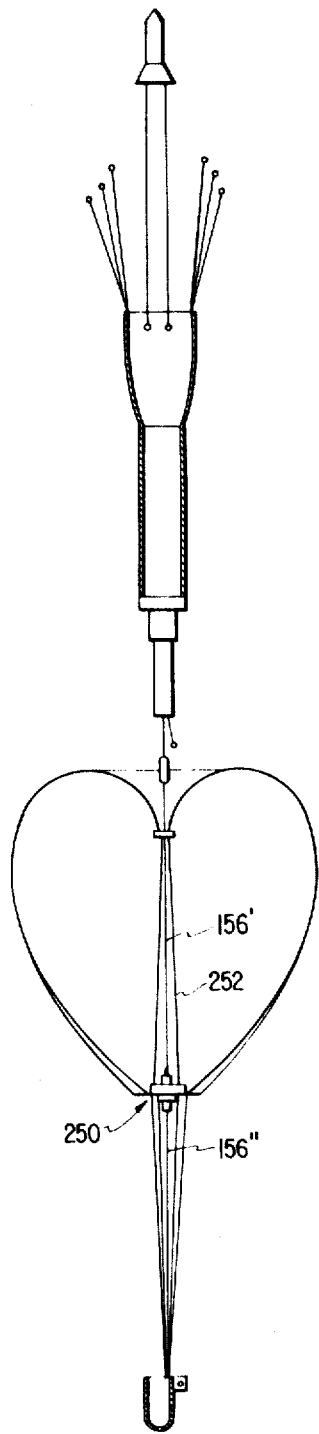
FIG. II
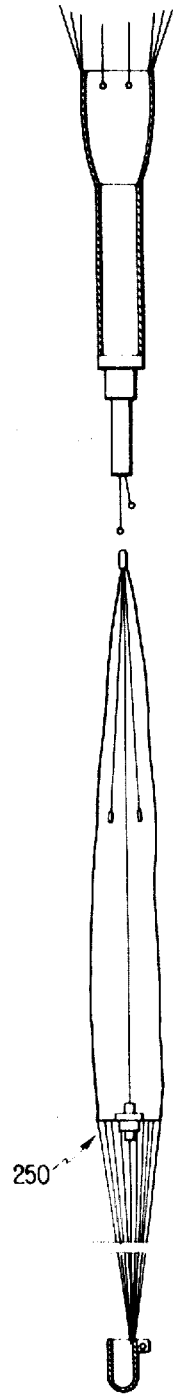
FIG. 12
INVENTORS.
FRED B. STENCEL
EUGENE HENSLEY
BY *Arnold, Roylance,*
*Kruger & Durkee*
ATTORNEYS.

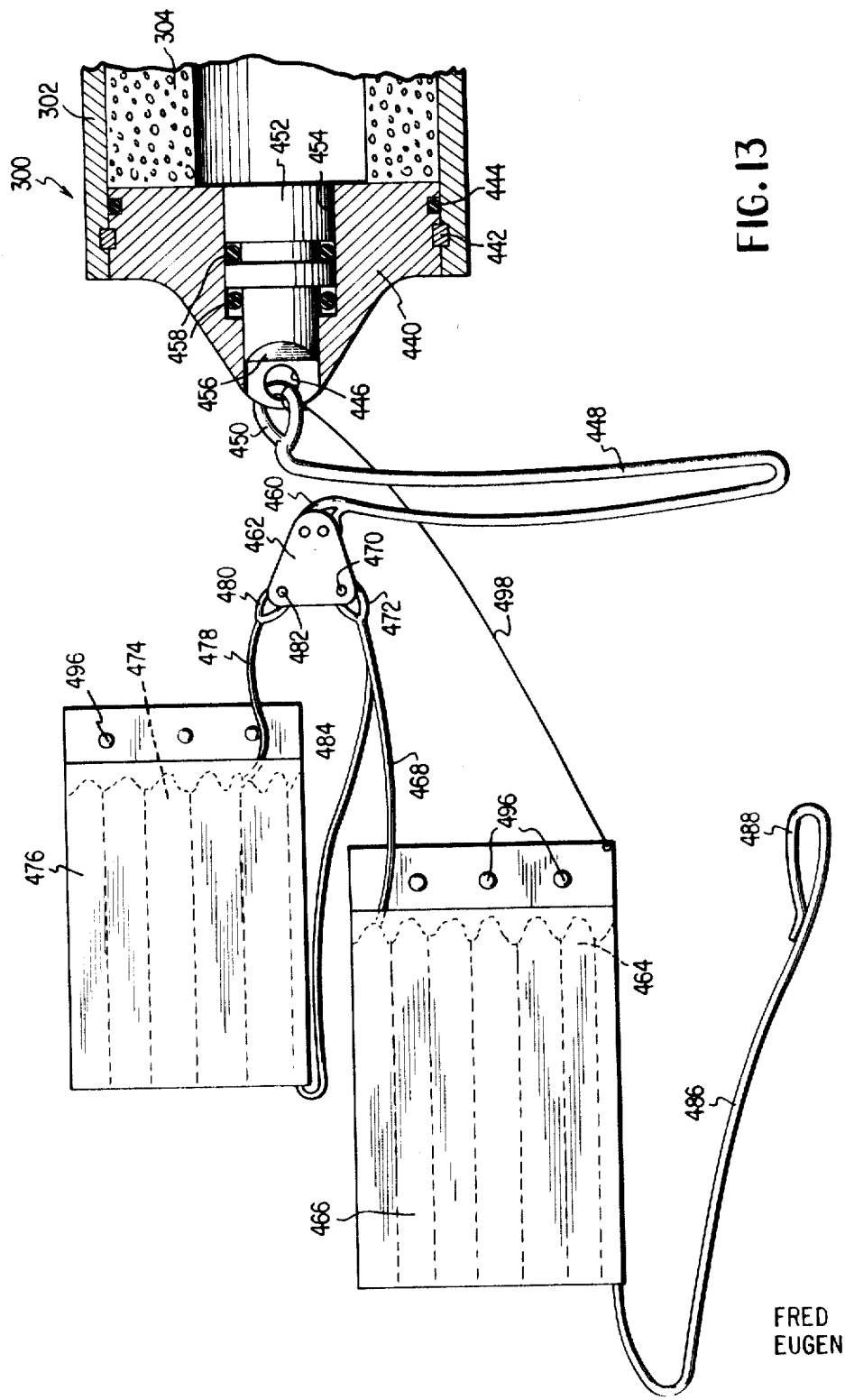

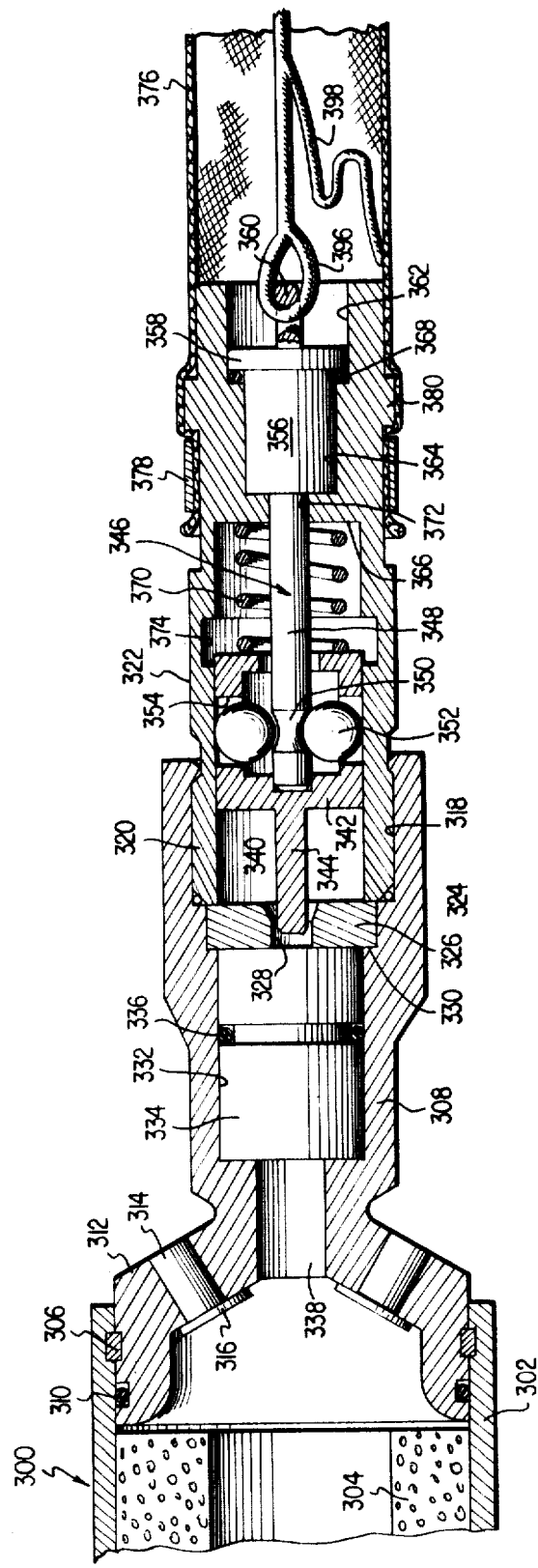

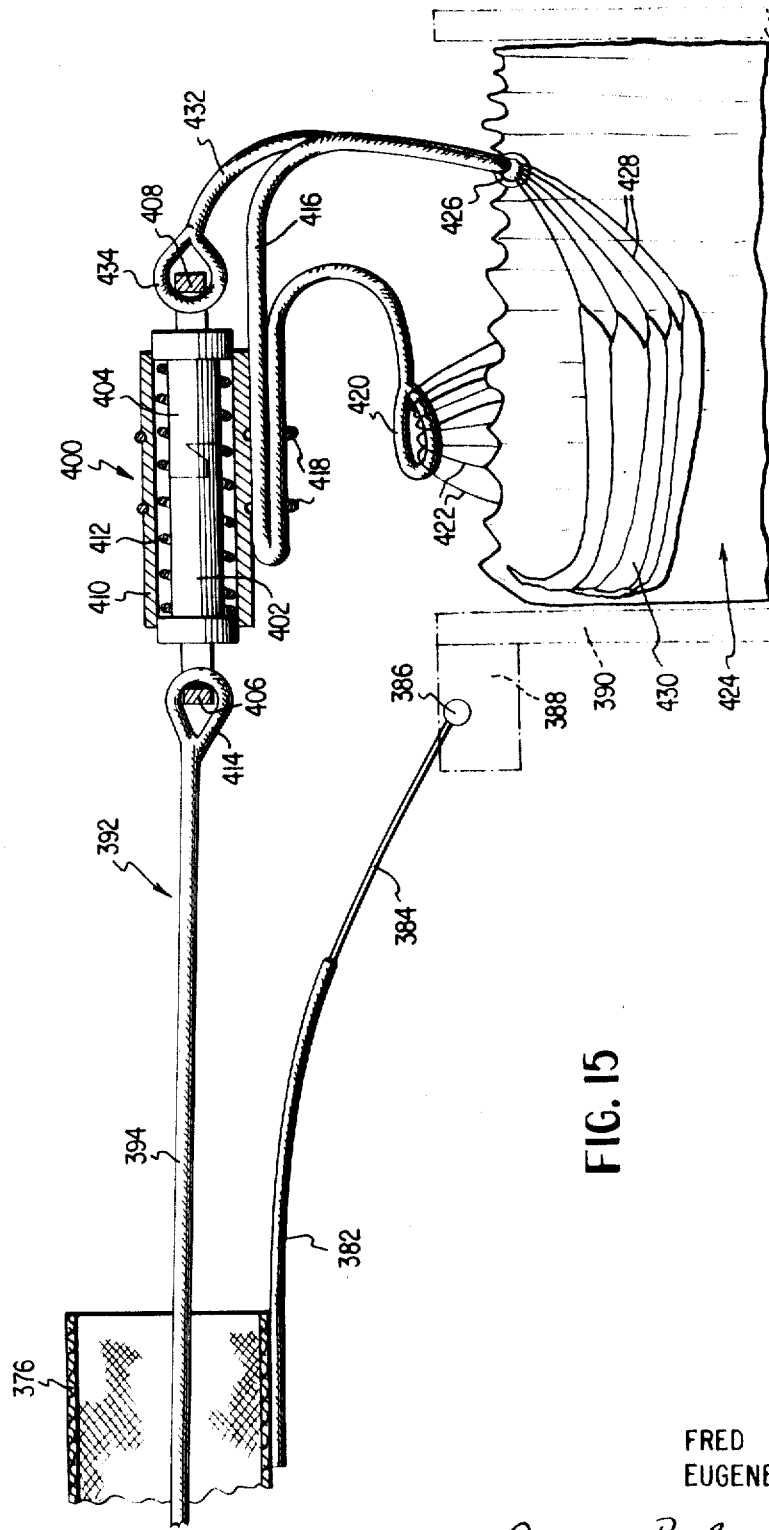

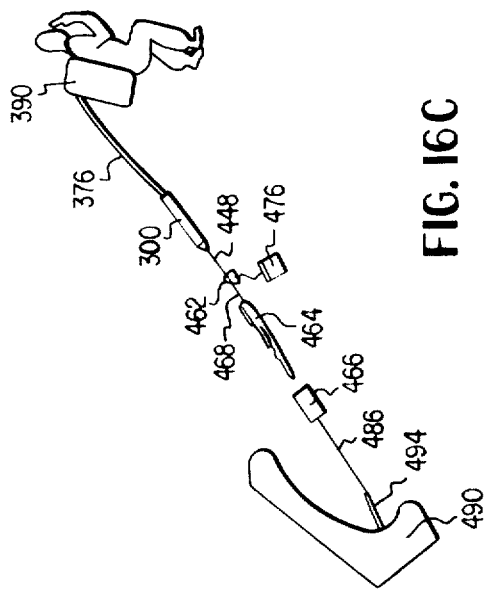
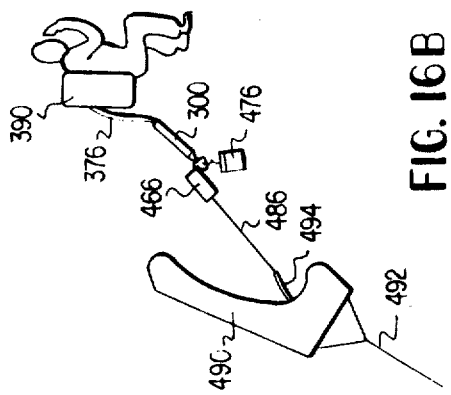
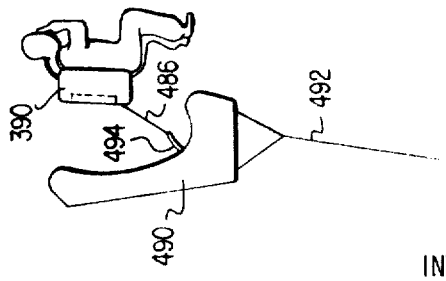

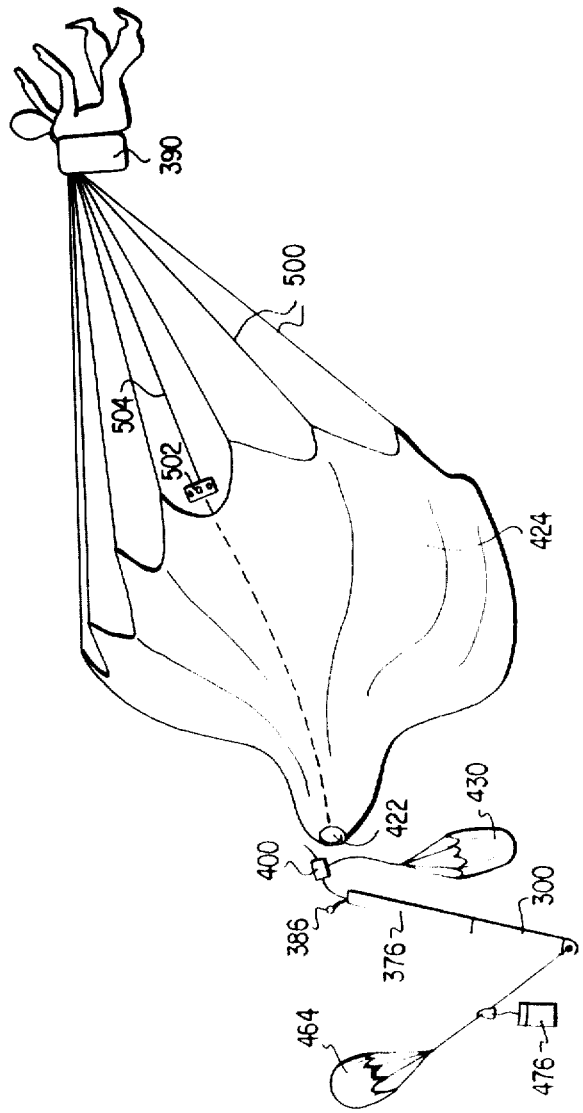
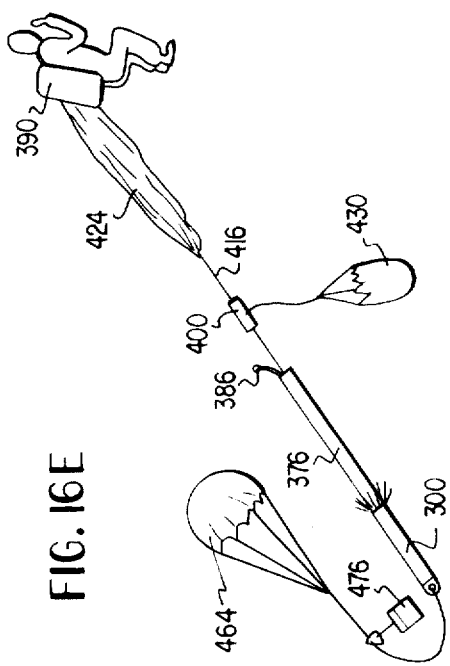
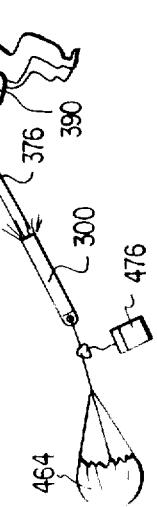

INVENTORS.
FRED B. STENCEL
EUGENE HENSLEY

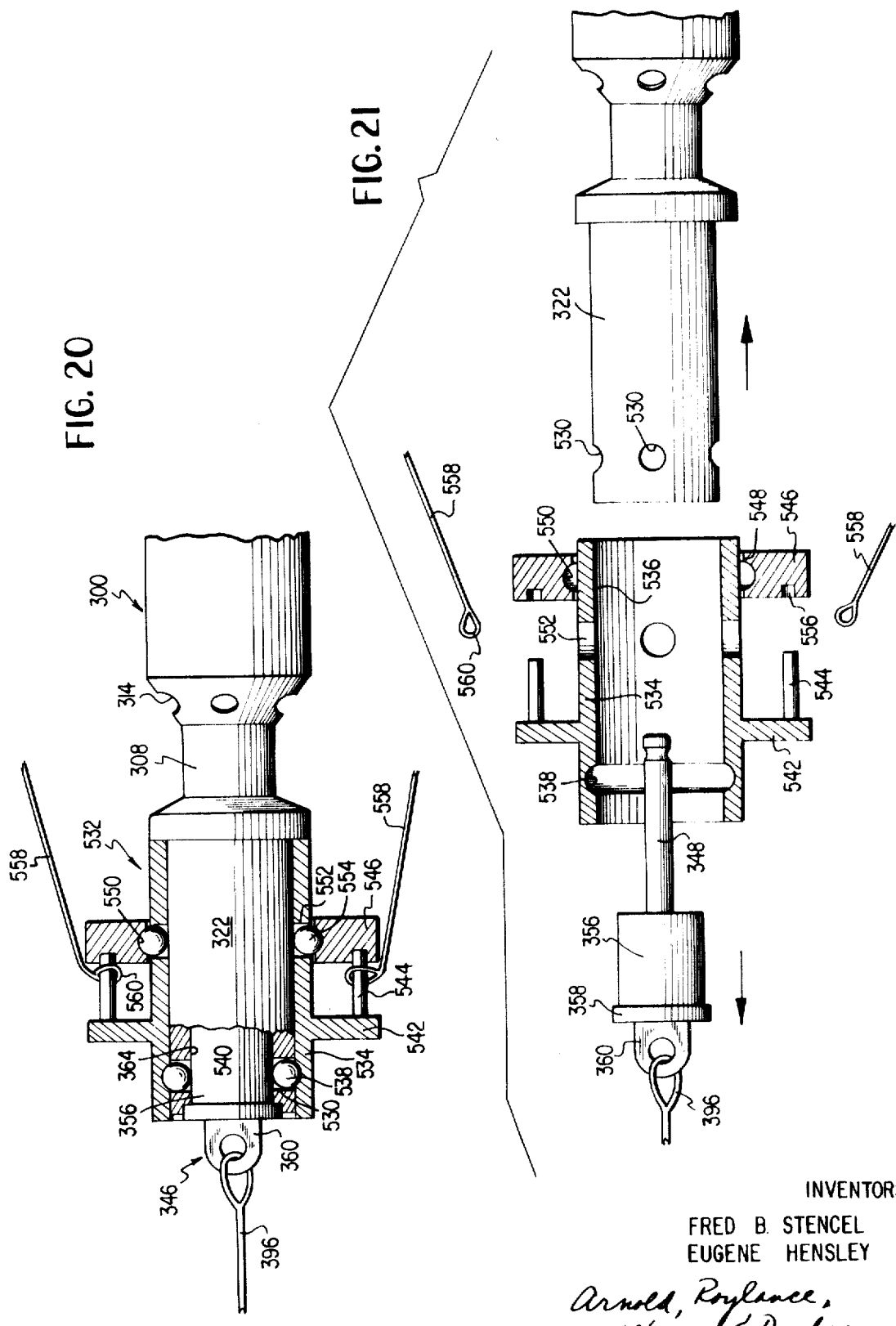

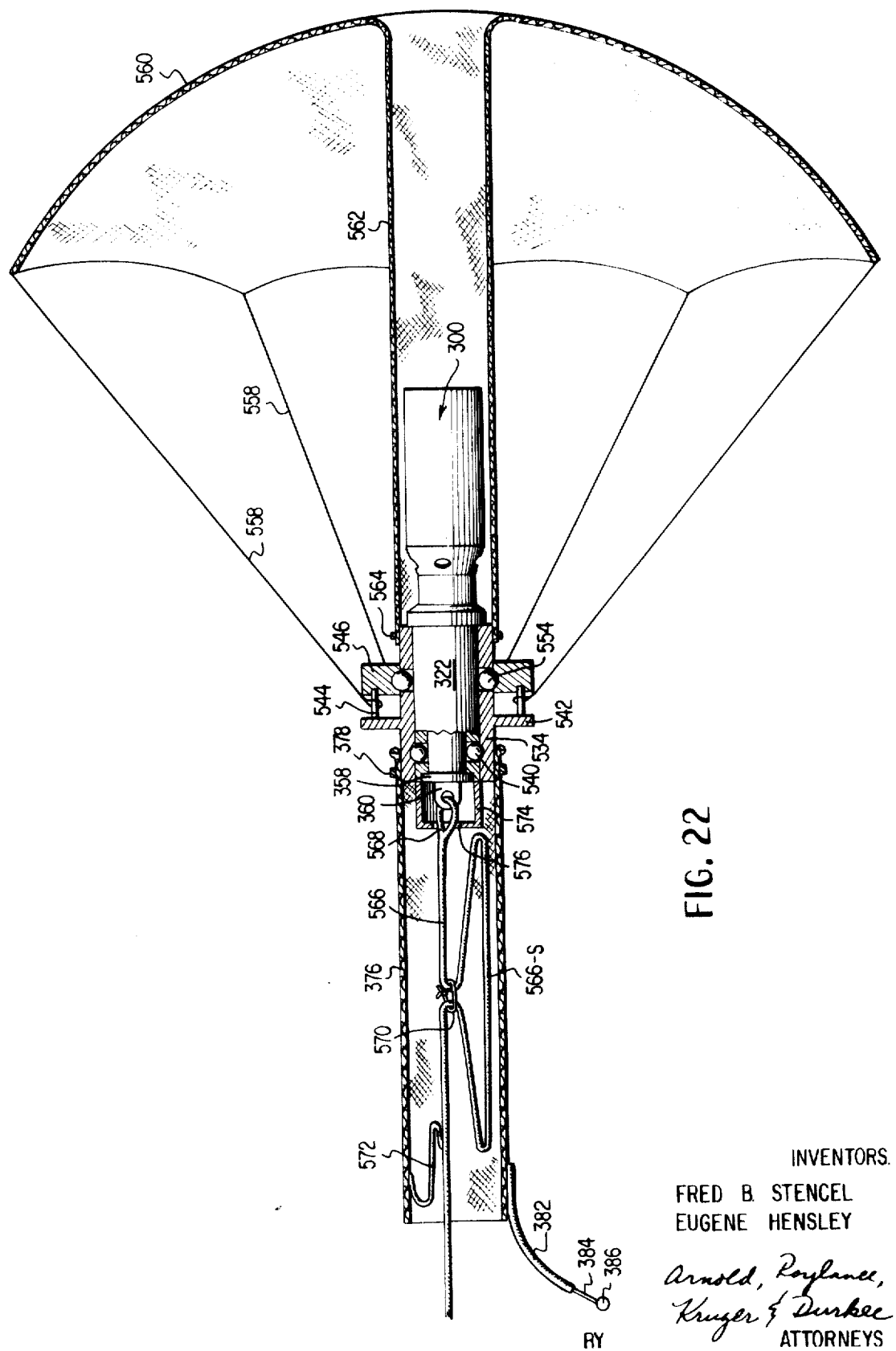

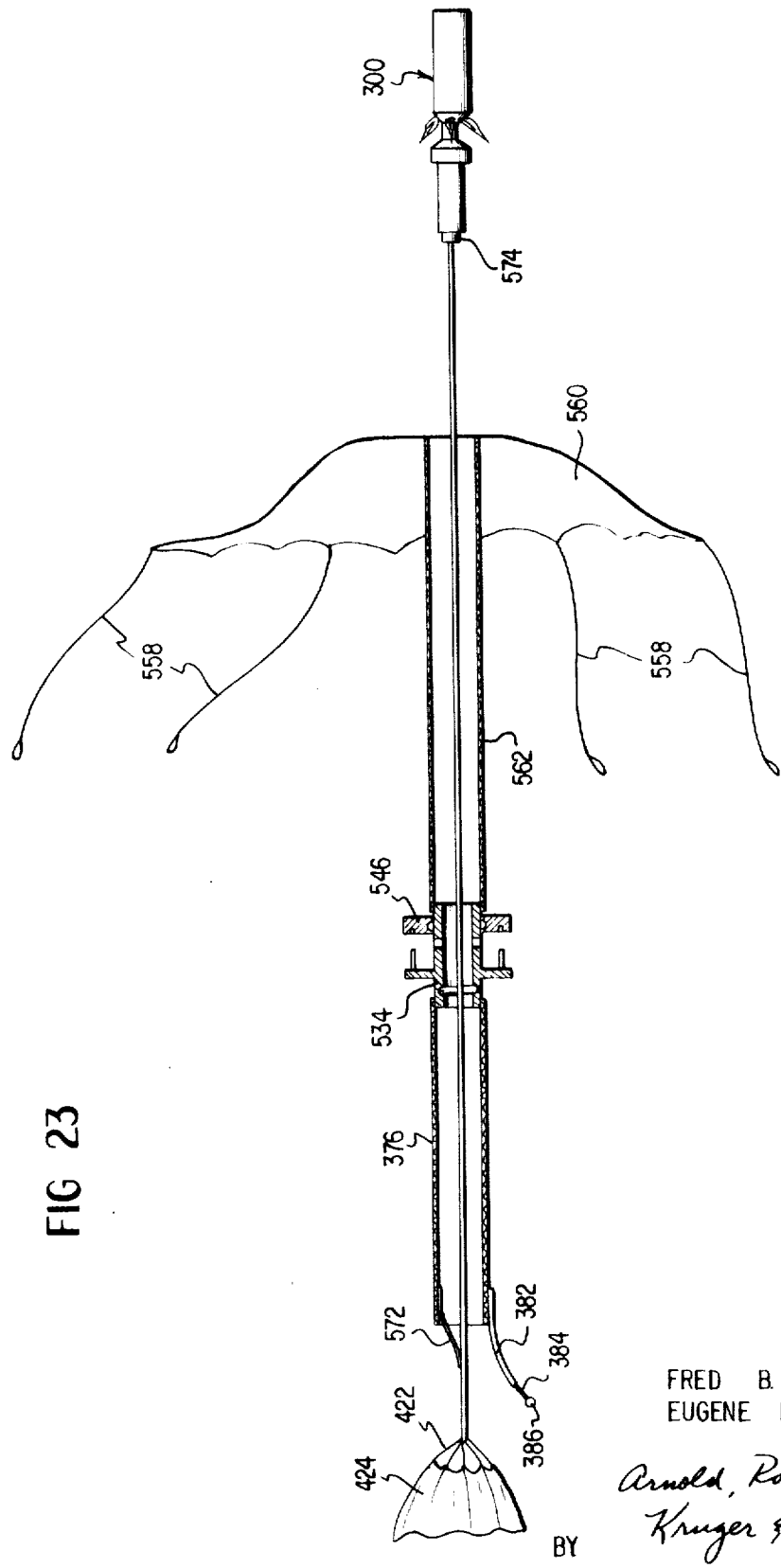

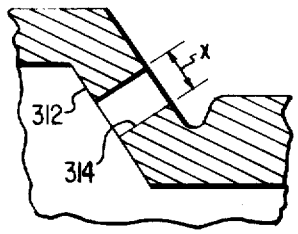
FIG. 24
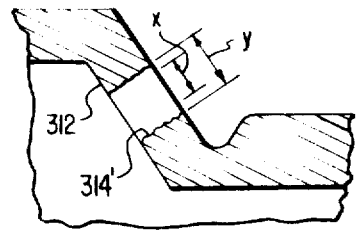
FIG. 25
FIG. 26
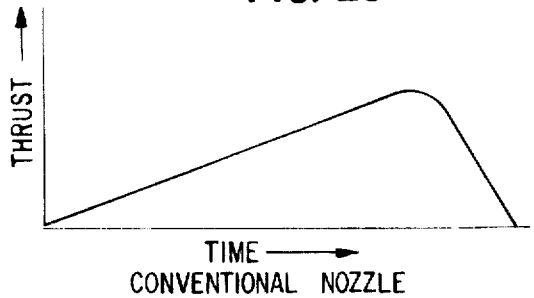
FIG. 27
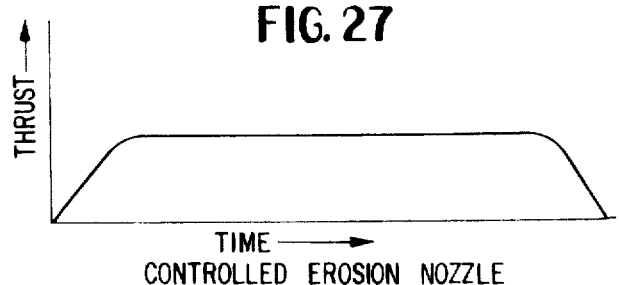
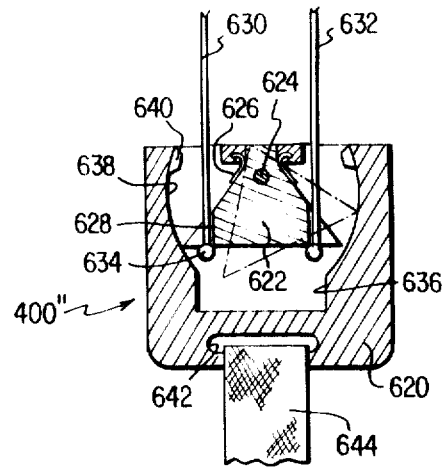
FIG. 29
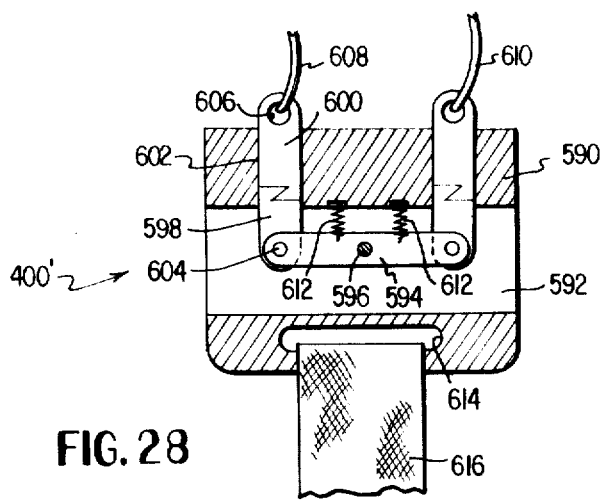
FIG. 28

PARACHUTE DEPLOYMENT SYSTEM, INCORPORATING A ROCKET

This application is a continuation-in-part of application Ser. No. 744,134, filed July 11, 1968 now abandoned, in the name of Fred B. Stencel.

This invention relates to parachute deployment apparatus and more particularly to a pilot parachute oriented rocket device which, when fired, extracts the main canopy or parachute from its container and deploys it into the airstream.

The use of pilot or drogue parachutes, sometimes referred to hereinafter as pilot chutes to aid in the deployment of a main canopy or parachute is well known and commonly employed. Such a pilot or drogue chute is customarily connected to the apex of the main canopy and, as the airstream forces act on the pilot chute, such forces are transmitted through the pilot chute lines to the main canopy to extract the main canopy and its suspension lines from the main canopy container and then to deploy the main canopy to fully stretched condition. The main canopy is, of course, attached to the man or the load to be recovered. When this fully stretched condition is reached, the mouth of the canopy opens to permit a symmetrical inflow of air which inflates the main canopy. If, as is desired, the pilot chute prealigns the main canopy with the airstream, the inflation will be regular, orderly, and symmetrical and such malfunctions as line-overs, partial canopy failures induced by a symmetrical air inflow and subsequent stress concentrations, and so on, will be eliminated or substantially reduced.

Another consideration with respect to canopy deployment, however, is the time in which deployment and subsequent inflation occur. The use of a conventional pilot or drogue parachute necessarily causes main canopy deployment to be dependent upon the airstream velocity. It is considered to be both desirable and beneficial to provide a system wherein deployment is obtained in a minimum time, or, at least, within a predetermined time. HOwever, one of the difficulties with maximizing the speed of deployment is that excessive snatch forces might be produced. Such snatch forces are those which result when the canopy is very quickly deployed and when the mass of the canopy is arrested as the lines thereof are fully stretched. If such snatch forces are excessive, they can cause physiological damage, should the main canopy be attached to a man, or alternatively, can cause undue and potentially damaging shock forces, should the canopy be attached to a load, particularly a fragile load such as electronic instruments or the like, and similarly, these shock forces may structurally damage the parachute itself, or its critical parts.

WIth the foregoing in mind, it is, therefore, an object of the present invention to provide a parachute deployment system and means wherein deployment is accomplished within a preselected time, preferably held to a minimum as limited only by snatch force and inflation shock considerations.

Another object of the present invention is to provide a canopy deployment system wherein deployment is accomplished in a substantially constant minimum time regardless of the airspeed velocity.

Another object of the present invention is to provide a novel means for prealigning a parachute with the airstream and for thereafter deploying the parachute.

Another object of the present invention is to provide novel deployment means for a parachute which incorporates reefing means, thereby assuring that when inflation occurs, it will be orderly, rapid and symmetrical.

The foregoing broad objectives of the present invention are accomplished through the use of an extraction rocket device which is cooperatively assembled with a pilot chute means. The pilot chute orients the rocket downstream but a control means prevents the rocket from igniting. After a predetermined time interval or other condition, a release means frees the control means and enables it to ignite the rocket which fires in a downstream direction thereby causing the main canopy to be extracted from its container and deployed downstream. Additionally, means can be incorporated to automatically disrupt the aerodynamic drag forces of the pilot chute substantially simultaneously with ignition of the rocket. As a result of such removal of the aerodynamic drag forces from the pilot chute, the deployment velocity will be determined largely by the impulse or thrust forces of the rocket and will be substantially unaffected by the airstream velocity.

In view of the foregoing, a further and more specific object of the present invention is to provide a rocket extraction device for deploying a parachute, such rocket extraction device being cooperatively assembled with a pilot chute means which serves to orient the rocket in a downstream direction.

A further specific object of the present invention is to provide a pilot chute system for orienting a deployment rocket device in a downstream direction, and to provide means for releasing the aerodynamic drag forces of the pilot chute simultaneously with ignition of the rocket so that the main canopy will be deployed primarily by the rocket forces.

A further specific object of the present invention is to utilize a rocket means for deploying a main canopy whose mouth is reefed by suitable means, such as a fail-safe spreading gun of the type described in Stencel et al. U.S. Pat. No. 3,281,098, so that when the rocket means fully stretches the main canopy and its lines, and the reefing means releases the main canopy mouth, inflation of the main canopy will occur in a symmetrical fashion.

A still further and more specific object of the present invention is to provide a pilot chute and extraction rocket combination for orienting and deploying a main canopy wherein ignition of the rocket is accompanied by simultaneous disruption of the pilot chute drag forces in a pattern which is symmetrical relative to the axis of the pilot chute canopy.

Other objects, advantages and salient features of the present invention will become apparent from the following detailed description, which, taken in conjunction with the annexed drawings, discloses various embodiments thereof:

Referring now to the drawings, which form a part of this original disclosure:

FIG. 3 is a diagrammatic elevational view illustrating a high speed stabilization produced by the pilot chute means;

Figure 1:
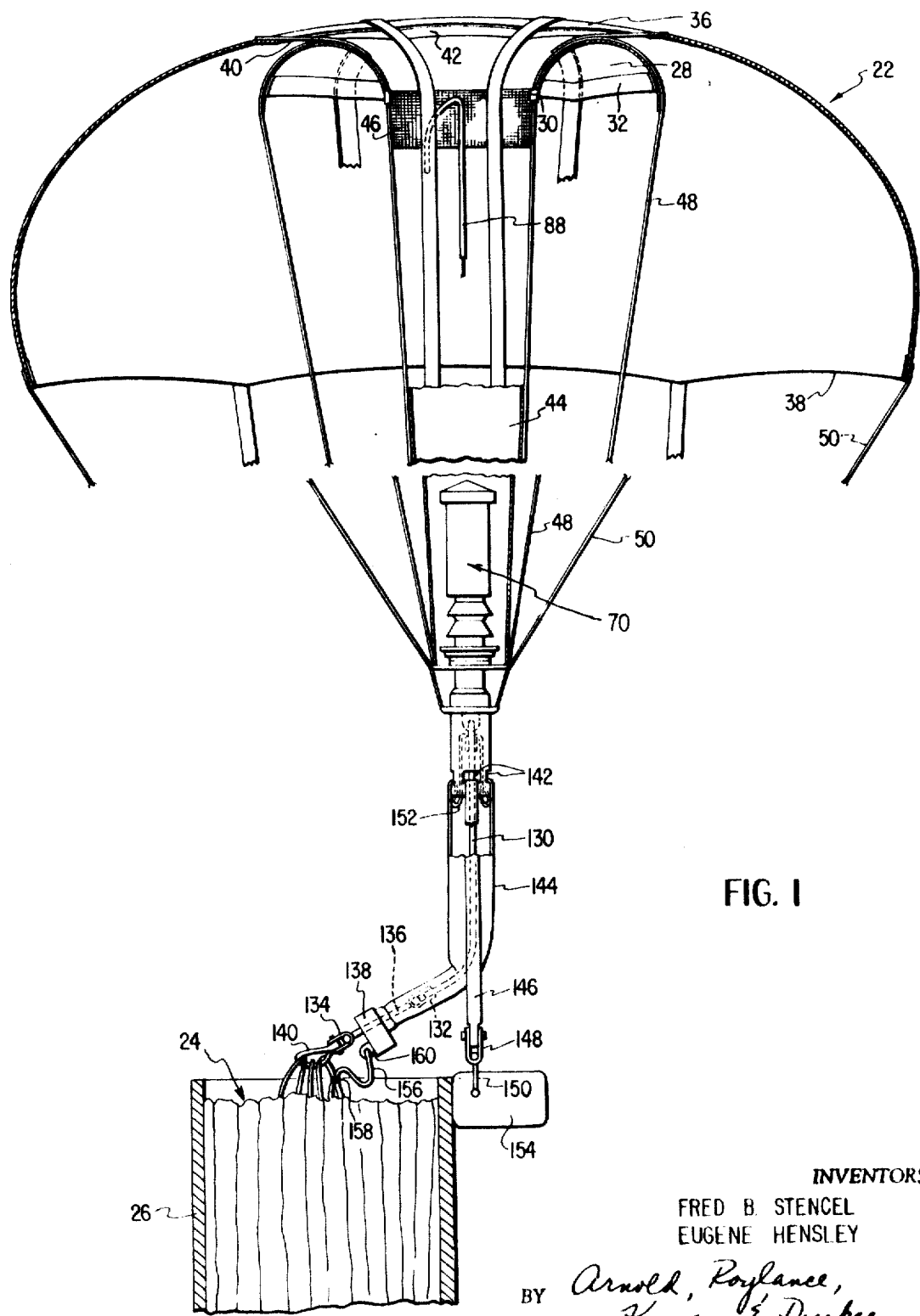
FIG. 1 is a side elevational view, partially in section, of apparatus in accordance with the principles of the present invention.
Figure 17:
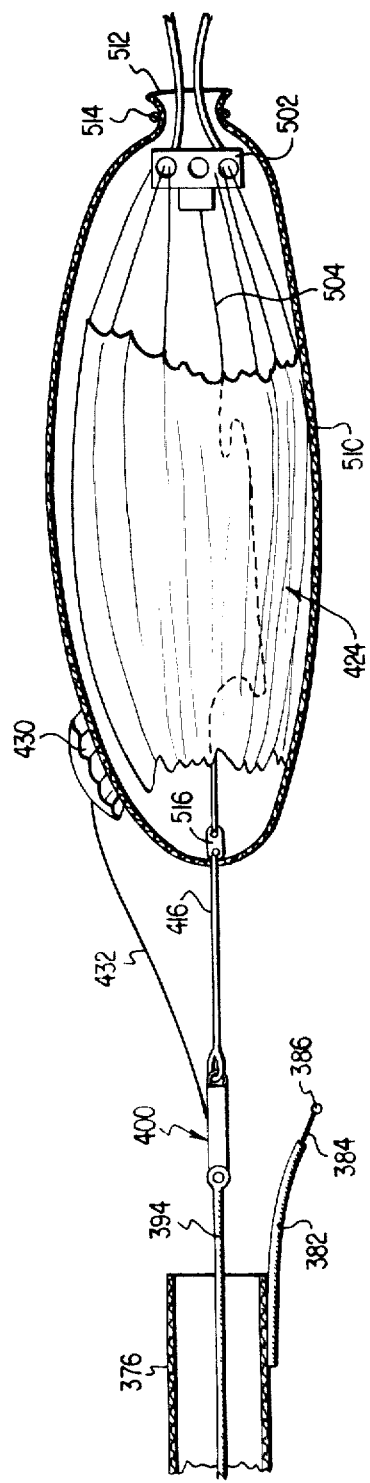
Figure 19:
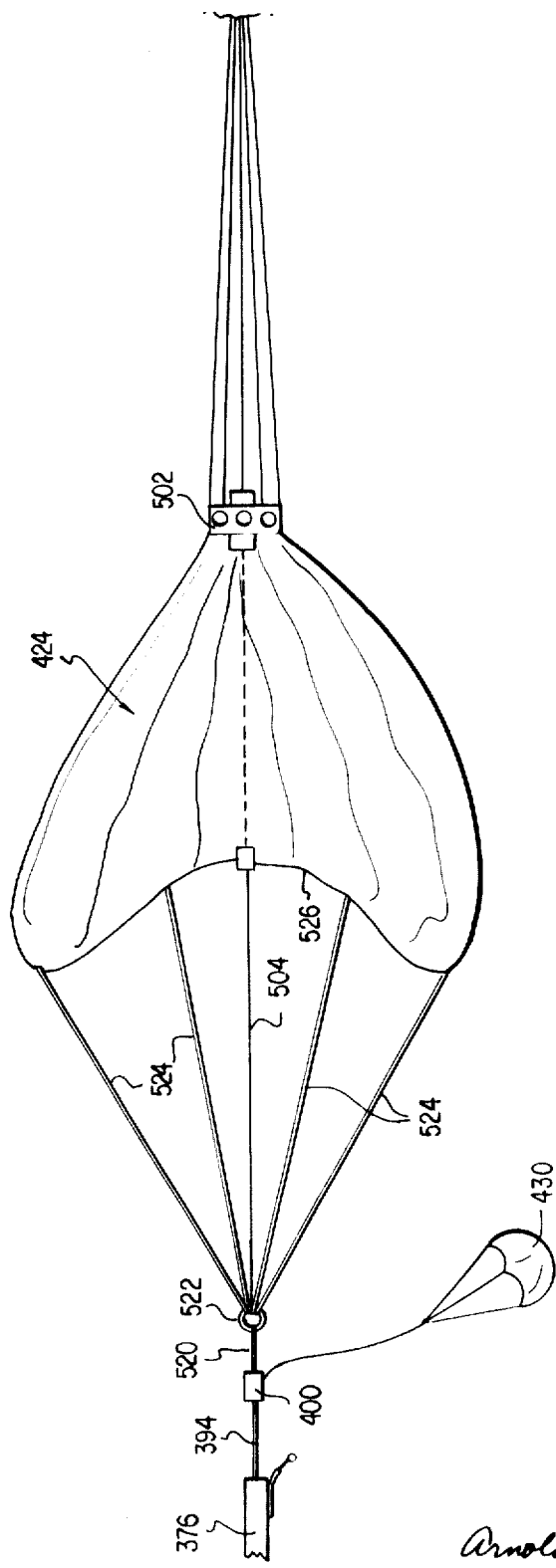

FIGS. 4—7 are diagrammatic elevational views illustrating, in progressive sequence, the manner in which the system of the present invention operates;

FIGS. 8—10 are diagrammatic elevational views illustrating, in progressive sequence, a modified system and its manner of operation;

FIGS. 11 and 12 are diagrammatic sequential views of the FIG. 1 embodiment as modified by inclusion of a reefing device for the mouth of the main canopy;

FIGS. 13, 14 and 15 are fragmentary sectional views, which, when combined, show a modified apparatus in accordance with the principles of the present invention;

FIGS. 16A through F illustrate a progressive operational sequence of the apparatus of FIGS. 13—15;

FIG. 17 is a fragmentary sectional view of a modification where the apparatus incorporates a deployment sleeve;

FIGS. 18A through C illustrate a progressive operational sequence of the apparatus of FIG. 17;

FIG. 19 is a fragmentary elevational view of a modified main canopy construction;

FIGS. 20 and 21 are fragmentary elevational views, partially in section, which illustrate a modified rocket and rocket housing, shown respectively in assembled and disassembled position;

FIGS. 22 and 23 are side elevational views, partially in section, which illustrate a modified apparatus of the present invention incorporating the arrangement of FIGS. 20 and 21;

FIGS. 24 and 25 are fragmentary sectional views showing a nozzle of the extraction rocket before and after firing;

FIGS. 26 and 27 are graphs comparing the time-thrust curve of a conventional rocket nozzle with the time-thrust curve of the nozzle shown in FIGS. 24 and 25; and FIGS. 28 and 29 are modified forms of override disconnect assemblies.

Referring now to the drawings in detail, there is shown in FIG. 1, one embodiment of the present invention which consists of an arrangement generally designated 20 wherein a pilot chute means generally designated 22 is already in downstream deployed position. It will, of course, be understood that the pilot chute means 22 can be initially packed in some suitable bag or container from which it is deployed into the airstream as the load enters into the airstream. The pilot chute means 22 is coupled, in a manner to be described in detail hereinafter, with a main canopy or parachute generally designated 24 housed within a parachute pack or container 26. The pack 26 is attached by suitable harness means, not illustrated, but of any conventional design, to a person or a load. The parachute pack 26 is only shown in illustrative form, but it will be understood that the same can be of any suitable type, such as that disclosed in U.S. Pat. No. 3,286,959, issued Nov. 22, 1966. Prior to opening of the parachute pack or container 26, or alternatively, prior to initiation of deployment of the main canopy 24 therefrom, the pilot chute means 22 acts as a stabilizing drogue. As such, it enters the airstream, inflates, and trails the packed main canopy 24 in a downstream direction.

To further describe the pilot chute means 22, it will be seen that such chute means includes a smaller inner high-speed pilot chute and a larger outer breakaway low speed aerodynamic augmenter or pilot chute. More specifically, the inner chute is formed by a generally semitoroidal canopy 28 having an inner edge 30 and an outer edge 32. Additionally, a large ring-Shaped outer canopy 34 is provided, such canopy having an inner edge 36 and an outer edge 38. A series of connecting tapes 40 attach the inner edge 36 of the canopy 34 to the crown of the inner pilot chute canopy 28, and as a result of this construction, an annular opening or slot 42 is formed between the inner and outer canopies. When the pilot chute means 22 is traveling through the airstream, air passes through the slot 42 to provide the necessary pressure differential so that the inner canopy 28 will remain inflated. A hollow generally cylindrical guide sleeve 44 projects from the inner edge of the inner pilot chute 28 to a rocket retention housing which will be described in detail hereinafter. It should be noted at this point, however, that the sleeve includes a porous material 46, such as a nylon net, which connects with the inner edge 30 of the inner pilot chute 28 to thus provide a flow control screen which permits airflow from the inflated torodial chamber of the canopy 28 toward the axis of the parachute. Such flow further enhances a pressure differential as created by the slot 42, to further assure that the inner pilot chute canopy 28 will be fully inflated. As is conventional, the inner pilot chute is provided with a series of suspension lines 48 extending from the outer edge 32 thereof, in a converging path, toward the rocket retention housing to be described hereinafter. Similarly, the outer canopy 34 includes a plurality of suspension lines 50 extending from the outer edge 38 thereof and a converging manner similar to that of the inner suspension lines 48.

Figure 2:
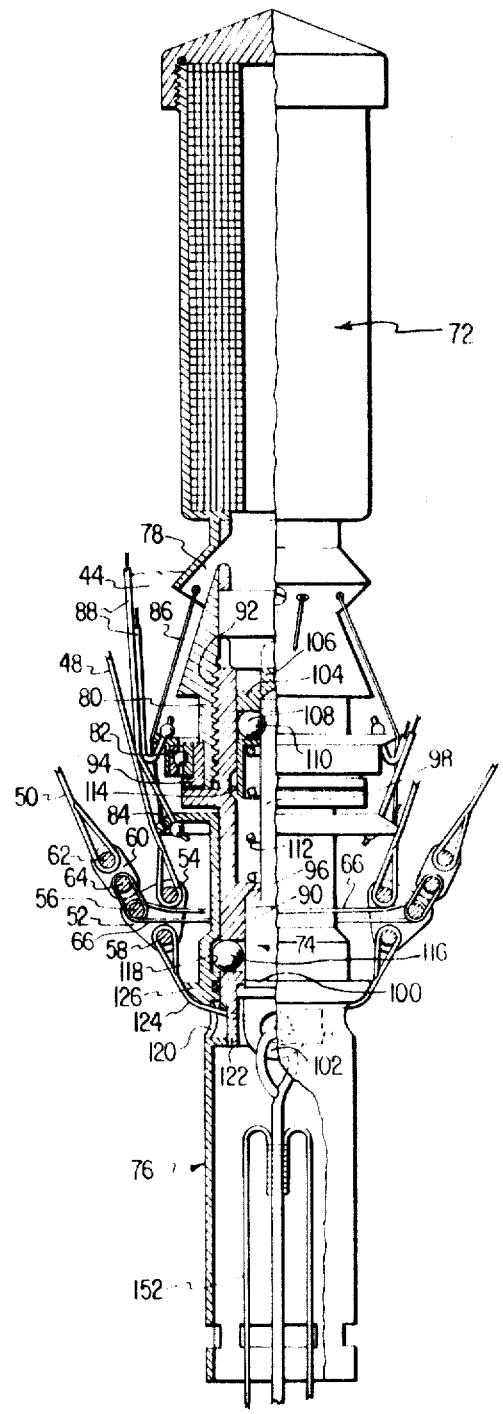
FIG. 2 is an enlarged sectional view showing the details of the extraction rocket and its firing and mounting means.

Referring now to FIGS. 1 and 2 in further detail, it will be noted that a series of integrating links 52 are provided in surrounding relationship to the rocket retention housing near the point at which the pilot chute suspension lines converge. Such integrating links 52 are illustrated as being formed of generally triangular configuration with three spaced projecting pins 54, 56 and 58 affixed thereto. The end of the suspension lines 48 from the inner canopy 28 are attached to the pins 54 on the integrating links. A further set of links 60 are provided, each carrying a pair of spaced pins 62 and 64. The suspension lines 50 for the outer pilot chute canopy 34 attach to the pins 62.

The pins 64 of the link 60 are attached to the pins 56 on the integrating links 52 by means of a continuous break cord 66. The break cord 66 is formed as a continuous lacing loop connecting all of the pins 64 with the pins 56 adjacent to the pins 64, and as a result, the overall effect of the laced and looped break cord 66 is to connect the outer canopy suspension lines 50 with the same integrating links which connect with the inner chute suspension lines 48.

When the arrangement is subjected to low airspeeds, or is, in other words, accomplishing a low speed stabilization, the aerodynamic forces acting on the outer canopy 34 will not be sufficient to exceed the strength of the break cord 66, and as a result, the pilot chute means 22 will retain the configuration shown in FIG. 1. However, when high-speed stabilization is accomplished, that is, when the airspeed is high and the aerodynamic forces on the outer canopy 34 are great, such forces will be transmitted through the outer canopy suspension lines 50 and their attached links 60 to the break cord 66. When the breaking strength of the cord is exceeded at any point, the cord 66 will break and thus unlace, thereby releasing all of the outer suspension lines 50 from connection with the integrating links 52. The fact that only one single continuous laced and looped break cord 66 is used assures that all of the suspension lines 50, rather than just some of such lines, are released and hence no asymmetrical distortion of the outer canopy 34 can be created. FIG. 3 illustrates the position assumed by the outer canopy 34 once the cord 66 breaks and the outer suspension lines 50 are released. It will be noted that, due to the aerodynamic forces of the airstream, the canopy 34 trails rearwardly of the inner canopy 28 which is still inflated and, of course, the suspension lines 50 and the links 60 attached to the ends thereof trail out in the airstream.

Regardless of whether the initial stabilization by the pilot chute means 22 is of the low speed type illustrated in FIG. 1 or the high-speed type illustrated in FIG. 3, such stabilization will serve to orient the rocket device in a downstream position within the airstream. The rocket device itself is generally designated 70 and includes a rocket motor means generally designated 72 and a firing mechanism generally designated 74. The rocket device is supported upon a rocket retention housing generally designated 76 which is attached to the end of the aforementioned guide sleeve 44. As a result, at least the rocket motor 72 is disposed within the inner portion of the guide sleeve 44 in the manner illustrated in FIG. 1.

The rocket motor 72 is provided with a series of discharge nozzles 78 disposed above the periphery thereof adjacent the rear end of the rocket. The nozzles 78 may be canted, if desired, to give a spin to the rocket as the same is fired outwardly through the sleeve 44. The rear end 80 of the rocket motor is provided with an internal recess having screw threads to receive and accommodate the firing mechanism 74 which will be described in detail hereinafter. A conventional roller bearing means 82 is attached to the rear end 80 of the rocket motor to permit spin thereof due to the canted orientation of the rocket nozzles 78.

The rocket retention housing 76 is formed as a hollow cylindrical member whose upper portion receives and accommodates the lower end of the firing mechanism 74. An outwardly directed flange 84 is provided at the outer end of the retention housing 76 and this flange provides three separate supports or attachment functions. First of all, the inner end of the sleeve 44 is attached to the flange 84 in any suitable manner. Secondly, fail-safe tie cords 86 connect between the flange 84 and each rocket nozzle 78. The purpose of these cords will be set forth in further detail hereinafter. Finally, the flange 84 on the rocket retention housing serves to attach the outer end of a plurality of rocket tow cables 88. As shown in FIGS. 1 and 2, these cables 88 extend upwardly, in the orientation of these figures, along the exterior of the sleeve 44 until they reach the mesh portion 46 thereof. At this point, the cables 88 penetrate through the mesh, make a 180° turn, and travel downwardly along the inner walls of the sleeve 44 and terminate by attachment to the outer race of the roller bearing 82. The cables 88 are steel cables jacketed by a suitable polymeric material, such as Teflon (polytetrafluroethylene).

Before continuing with the description of the rocket retention housing 76, it may be appropriate to describe the firing mechanism 74 in further detail. Such mechanism includes a housing 90 having a threaded outer end 92 which engages with the threaded inner end on the interior of the rear portion 80 on the rocket motor. An outwardly directed peripheral flange 94 is provided intermediate the housing 90 to engage against the terminal end of the rocket motor 72. As a result, the housing 90 can be threaded into the rear portion 80 of the rocket motor until the flange 94 is seated in the manner shown in FIG. 2. The housing 90 includes an inwardly directed shoulder 96 which circumscribes and defines an aperture through which the shank of an elongated firing pin 98 extends. The firing pin 98 includes an elongated head portion 100 which terminates in an eye 102 through which a firing lanyard can be attached in a manner to be described hereinafter. A striker member 104 is slidably disposed within the outer end of the housing 90 and includes an elongated peripheral skirt portion which slides along the walls of the central bore in the housing 90. The striker member 104 includes a projecting head 106 which is adapted to engage against and fire a primer not shown, for initiating ignition of the rocket motor 72. As shown in FIG. 2, the striker member 104 includes a plurality of radial bores, each of which houses a spherical ball 108. The inner end of the shank 98 on the firing pin is engaged with the striker member by means of an interfitting relationship between the spherical balls 108 and an annular groove portion 110 along the shank. A helical compression spring 112 reacts between the shoulder 96 on the housing and the striker member 104 to thus normally urge the striker member toward the rocket motor 72. As a result of the biasing force of the spring 112, the balls 108 normally engage with the smooth cylindrical bore adjacent the outer threaded portion of the housing 90, and as a result, the balls 108 are forced into engagement with the annular groove 110 and the shank 98 of the firing pin. In this manner, the balls 108 act as a locking device which assembles the striker member 104 and the firing pin shank 98 to one another. However, an inwardly directed annular groove 114 is provided along the walls of the bore of the housing 90, and when the biasing force of the spring 112 is overcome, in a manner to be described hereinafter, so that the striker member 104 is pulled downwardly until the balls 108 align with the groove 114, such balls will enter the groove 114 and will hence unlock the shank 98 of the firing pin.

On the opposite side of the shoulder 96, the housing 90 is provided with a further series of radially extending bores, each of which includes a spherical ball member 116. As shown in FIG. 2, these balls 116 are normally aligned with an inwardly directed annular groove 118 formed along the walls of the rocket retention housing 76, and as a result, since the head portion 100 of the firing pin prevents the balls 116 from moving inwardly, such balls serve as a locking device for assembling the firing mechanism to the rocket retention housing. Also, since the rocket motor 72 is itself physically connected to the firing mechanism 74, it will be understood that the balls 116 serve as a locking device which couples the rocket motor 72 with the rocket retention housing 76.

The rocket retention housing 76 is provided with a series of openings 120 adjacent the terminal or butt end 122 on the firing assembly housing 90. The eye 102 is disposed interiorly of this butt end 122 and a cord 124 extending through the openings 120 in the rocket retention housing is looped about the butt end 122 by at least two loops. The ends of the core 124 are attached to the pins 58 on the integrating links 52, and as a result, when the apparatus is in the condition shown in FIGS. 1 and 2, the cord 124 will tightly hold the integrating links 52 and all of the pilot chute suspension lines directly or operatively attached therewith. The rocket retention housing can be provided with an outwardly directed and arcuately curved flange portion 126 along which the cord 124 can ride and abut.

Before describing the manner in which the firing mechanism 74 operates to (a) unlock the rocket motor from the rocket retention housing, (b) release the pilot chute suspension cables from their attached position, and (c) fire the rocket motor 72, it should be noted that a firing line or lanyard 130, which will also serve as the deployment line for the main canopy 24, is provided with one end thereof attached through the eye portion 102 of the firing pin. The other end of the line 130 attaches to a clevis 132 which is connected to another clevis 134 by means of a short line 136 which traverses through a release device 138. A loop 140 is trained over the clevis 134 and is attached with the loops forming the apex of the main canopy 24. The lower end of the rocket retention housing 76 is provided with a series of slots 142 which support the upper end of a flexible hollow control sleeve 144 which surrounds the line or lanyard 130, and connects to the release device 138. Thus the firing line itself is fully housed within and protected by the sleeve 144. Additionally, the control sleeve is provided, intermediate its ends, with a suspension or attachment band portion 146 terminating in a clevis 148 which supports a short anchor line 150. The bands 146 could, if desired, be connected directly to the rocket retention housing 76. Within the anchor sleeve 144, a series of normally slack loops 152 connect between the end of the firing line 130, adjacent the eye portion 102 on the firing pin, with the other end of the slack loops being attached to the outer end of the anchor sleeve 144.

It will be noted that a release means or device 154 is provided for engaging a ball 151 at the end of the anchor line 150, and while this release device is illustrated as being directly attached to the parachute pack 26, it could also be separate therefrom and merely operatively connected therewith, such as by being carried on the load. The details of the release device 154 have not been illustrated herein since such details form no part of the present invention. In fact, the release device 154 can be of any suitable conventional type of construction, but preferably, it is timer controlled so that after a preselected time interval, it releases the anchor line 150. The release means 154 can also operate responsively to some condition other than time, such as airspeed, altitude, barometric pressure, and so on. The release means can consist simply of a line cutter, which, in response to a signal at the preselected time or condition, simply cuts the anchor line 150. Also, it can be a gripper-type device which ordinarily grips the ball 151 at the end of the anchor line, but which releases such ball at the preselected time or condition.

It is important to understand how the release means 154 operates in conjunction with the "control means" of the present invention to control ignition of the rocket 72 and hence deployment of the main canopy 24. The "control means" consists of the control sleeve 144, the band or bands 146 connected thereto and the anchor line 150 with its ball end 151. The "control means" permits a certain amount of movement under the influence of the aerodynamic drag forces from the pilot chute means, which movement, among other things, permits the firing line 130 to be partially but not fully stretched. So long as the anchor line 150 and its ball end 151 remain connected with the release means 154, all of the aerodynamic drag forces from the pilot chute means are transmitted through the bands 146 and the anchor line 150 and none of such drag forces are transmitted to or through the firing line 130. In this manner, the arrangement is fully protected against premature firing of the firing mechanism 74 as a result of inertial or aerodynamic forces since such forces cannot be transmitted along the firing line 130. However, when the predetermined time lapse or condition takes place, the release means 154 releases the control means, thus permitting the aerodynamic drag forces to fully stretch taut, the control sleeve 144, whereupon such forces are transmitted along the firing line 130 as well, for firing of the rocket and deployment of the main canopy in a manner to be described in detail hereinafter.

To conclude the description of the components of this embodiment of the present invention, it will be noted that the main canopy 24 is provided with a center release line 156. This release line travels up through the interior of the main canopy, attaches to one of the loops of the apex of the canopy by means of a break tie cord 158 and terminates in eye member 160 which engages cooperatively with the release device 138. As illustrated in FIG. 1, the tie cord 158 assures that the centerline 156 initially has a slack loop extending between the apex of the main canopy and the eye member 160 cooperatively assembled with the release device 138.

Considering now the manner in which the embodiment just described operates, it has already been explained that the pilot chute means 22 will either assume the configuration shown in FIG. 1, in the event of a low speed stabilization or assume the configuration of FIG. 3, in the event of a high-speed stabilization. In either event, the pilot chute means will be directed in a downstream orientation thus exerting a stabilizing force as the parachute pack 26, and the man or load harnessed thereto, travels through the airstream. At a selected time or other condition, the release means or device 154 is operated. As previously explained, it is preferred that the release device 154 be timer operated, although the same can be manually controlled by the man, or can be explosively or otherwise controlled by means of a static released; from the aircraft, or can be actuated or energized in any other suitable and known manner. In any event, actuation of the release device 154 either releases the ball 151 or severs the anchor line 150, thereby releasing the connection between the bands 146 and the device 154. As this occurs, the control sleeve 144 starts to pull taut and the firing line 130 will pull taut since the aerodynamic forces from the drag chute will be transmitted directly thereto. The length of the firing line 130 within the control sleeve 144 has been so correlated with the length of the control sleeve itself that as the firing line 130 pulls taut, it pulls the eye member 102 downwardly in the orientation shown in FIG. 2, and hence the enlarged head portion 100 and the shank portion 98 of the firing pin are both pulled downwardly. Since the striker member 104 is coupled with the shank 98 by means of the attachment balls 108, the striker member is likewise pulled downwardly as the firing line exerts a pull on the firing pin. However, when the balls 108 come into alignment with the annular groove 114, the balls can move radially outwardly thereby releasing the striker member from engagement with the shank 98. At this time, the firing pin will still continue to move downwardly, in the orientation of FIG. 2, but the striker member 108 will now be free to move back upwardly toward the rocket motor 72, under the urging influence of the compression spring 112 which was compressed during retraction of the firing pin. As the striker member 104 moves upwardly, under the biasing force of the spring 112, the head portion 106 thereof will strike the primer, not shown, and hence initiate ignition of the rocket motor 72. It will likewise be noted that as the firing pin moves downwardly in the position of FIG. 2, the enlarged head portion 100 thereof passes below the level of the locking balls 116, thereby enabling such balls to move inwardly and thus unlocking the firing mechanism housing 90 from the rocket retention housing 76.

As the rocket is ignited, the exhaust from the nozzles 78 thereof will burn through the fail-safe lines 86, or alternatively, the thrust forces will break these lines 86. In either event, since the ball locks 116 have already been released, and since the fail-safe lines 86 are now broken, the rocket motor 72 will be fully disengaged from the rocket retention housing 76 and will merely be resting freely thereupon. Hence, the rocket can start to travel upwardly through the guide sleeve 44 due to the thrust forces generated by firing of the rocket. SInce the firing mechanism housing 90 is attached to the rocket, such housing will be lifted with, and will form a part of, the rocket 70. Thus, as the rocket 70 starts to travel up the guide sleeve 44, the terminal end 122 of the housing 90 will raise, thereby slipping out of the loops of the cord 124 surrounding the same. When the cord 124 is released in this manner, it releases the integrating links 52 and hence releases all of the pilot chute lines attached, either operatively or directly, therewith. Fig. 4 illustrates, in diagrammatic form, the condition of the overall assembly during a low speed stabilization and before the rocket is fired. In FIG. 5, there is shown, in diagrammatic form, the condition of the assembly as the rocket just starts to fire and travel up the sleeve 44, with the pilot chute lines being released.

Figure 6:
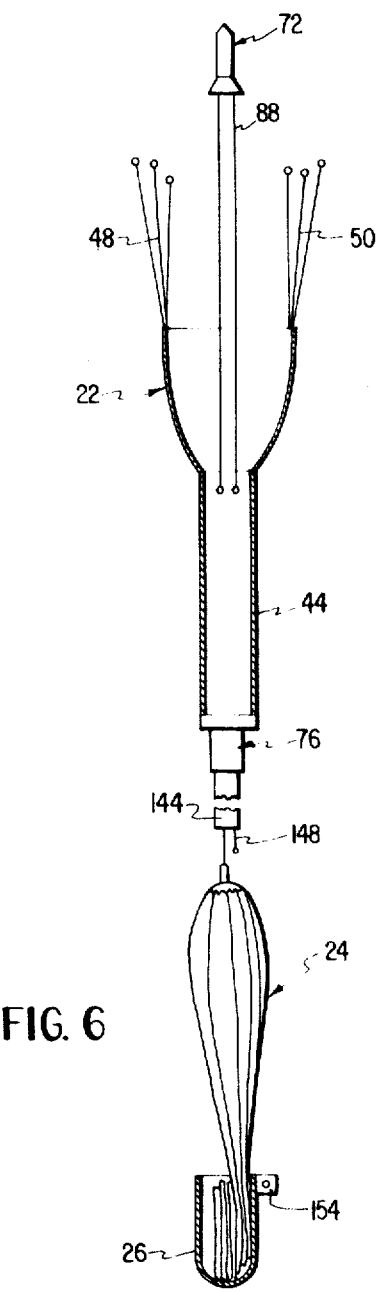
Figure 7:
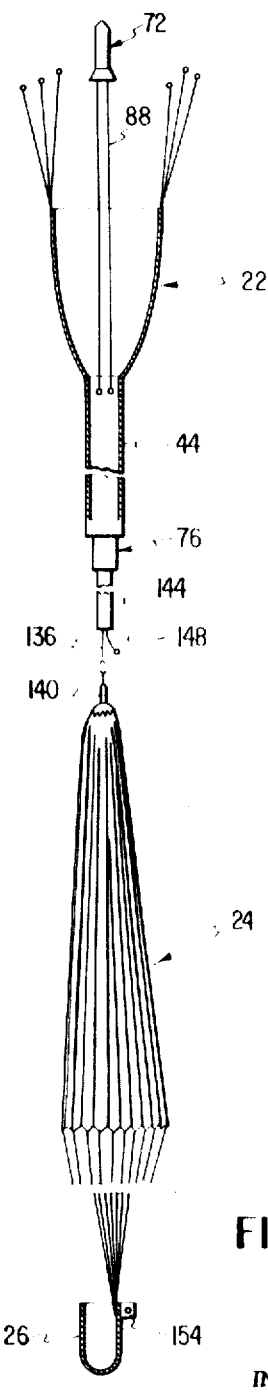

Referring to FIG. 6, it will be seen in diagrammatic form, that the pilot chute and the lines attached thereto will be pulled downstream by the aerodynamic forces acting thereon. As the rocket motor itself travels in a downstream direction, its course is guided initially by the sleeve 44 which prevents the rocket from becoming fouled with the pilot chute parts or from straying off course. The jacketed steel tow cables 88, which are attached to the outer race of the roller bearing 82, travel downstream along with the rocket and hence such lines unfold or unfurl as the rocket travels under its thrust forces.

Meanwhile, it will be remembered that as the rocket fired, the firing line 130 was pulled taut and the firing pin 102 was extracted from the firing mechanism. The loops 152 are thus also pulled taut and the forces are thus transmitted from the rocket retention housing 76 to the end of the sleeve 144, through the now taut loops 152 attached between the sleeve 144 and the line 130, and hence to the taut firing line itself. These forces may thus take up some of the slack in the line 156, but the member 160 won't be pulled, nor will the main canopy be extracted from its pack 26 until the tow lines 88 become fully extended and taut. However, when the lines 88 are taut, the rocket thrust forces will be transmitted all the way to the loop 140 on the apex of the main canopy 24 to thus extract the main canopy from its pack 26 and to rapidly deploy the main canopy downstream as shown in FIG. 6. Even though the size and charge of the rocket motor are such that the rocket motor can only fire for a short interval of time, nevertheless, the thrust forces which the rocket generates in a downstream direction assures a rapid and positive extraction and deployment of the main canopy.

As the rocket motor is burning out, or even after it has burned out, it is important to assure that such rocket motor will not cause any damage to the main canopy 24 after the same inflates, and for this purpose, means are provided for automatically releasing the rocket motor and all equipment attached therewith from the main canopy 24. For an understanding of this release, attention is again directed to FIG. 1 and the centerline 156 illustrated therein. The length of the centerline or pull line is just slightly less than the extended length of both the suspension lines for the main canopy and the canopy itself. Thus, just prior to full deployment of the main canopy, the line 156 will pull taut and will hence retract the member 160 from the release device 138. This retraction of the member 160 will actuate the release device which can be any suitable form of device such as, for example, a simple cutter. Thus, as the member 160 is pulled from the release device 138, the release device will sever the short length of cord 136 connecting the clevis 134 on the main canopy with the anchor sleeve. At this point, the main canopy will be fully released from connection with the other components of the assembly as shown in diagrammatic form in FIG. 7.

Under certain conditions, deployment of the pilot chute prior to opening of the main parachute pack may not be desirable and in such event, the release device 154 can be attached directly to the apex of the main canopy 24. Thus, as the pack 26 opens and the pilot chute means 22 starts to deploy and inflate, it will commence deployment of the main canopy by force transferral through the control sleeve 144. Once the apex of the main canopy has moved downstream a distance which is sufficient to assure time for a complete inflation and downstream orientation of the pilot chute means, a second centerline inside the main canopy can become taut to actuate the release device 154, and thereby unlock the short attachment line 150. At this point, the pilot chute forces will be transmitted directly through the firing line 130 and the rocket will be fired in a downstream direction, in the manner previously described. This embodiment of the present invention is also provided with a fail-safe feature to assure that snatch forces occurring during inflation of the pilot chute cannot displace the rocket relative to the sleeve 44 and thereby exerting firing force on the firing line 130. The ball lock device 116 between the firing mechanism and the rocket retention sleeve serves its purpose and assures that the rocket will not be fired until the sear is pulled. However, in the event that firing pin should be pulled intentionally by forces of the firing line, but the rocket itself should fail to fire due to a malfunction, the fail-safe lines 86 will nevertheless retain the rocket in attachment to the rocket retention housing. Thus, the rocket cannot move through the sleeve and the line 124 is not released, and therefore, the pilot chute will still remain inflated to exert drag on the main canopy for deployment of the same.

It has been noted through practice that 120 knots is a good dividing point between low speed and high-speed stabilization. Thus, until the airspeed reaches 120 knots, the break cord 66 will remain intact. After this speed has been exceeded, the cord 66 will break thereby permitting the pilot chute to assume the condition shown in FIG. 3. The firing pin is designed to operate with about 25 pounds of pull force and the pilot chute is sized so that at the lowest operational speed, it will exert a pull force that exceeds this amount. Additionally, to assure that a sufficient mass will be pulling on the firing line 130 at all times, the first few folds of the main canopy 24 can be held together with a break cord, not shown, having a strength which exceeds 25 pounds so that, in any event, the firing pin would be pulled before this cord broke.

In a modified embodiment shown in simplified and diagrammatic form in FIGS. 8—10, the rocket means 70 is initially housed in a chamber in the parachute pack 26 rather than being disposed in a sleeve within the pilot chute means 22. In FIG. 8, the pilot chute means 22 is deployed in a downstream direction but the line or lanyard 200 connecting the pilot chute with the forward end or nose of the rocket means 70 is not yet taut. As the line 200 pulls taut, it extracts the rocket means 70 and aligns or orients it in the downstream direction. It will be noted that another line or lanyard 202 connects between the rocket means and the apex of the main canopy 24. Just prior to the time when the pilot chute drag forces pull the line 202 taut, another line 204 pulls taut, thus pulling the firing pin for the rocket means 70. At this time, as shown in FIG. 9, the rocket means 70 ignites and is hence propelled downstream. This rocket thrust or impulse is transmitted through the line 202 to extract or deploy the main canopy from its pack 26. The length of the lines or lanyards 200 and 202 are correlated with the type of rocket means 70 which is employed. That is, the length of the line 200 is so selected as to assure that the rocket means 70 will burn out just prior to the time that it overtakes the pilot chute means 22, thereby preventing the rocket from fouling the pilot chute. Also, the length of the line 202 is so selected as to assure that the rocket exhaust will not burn or otherwise damage any portions of the main canopy 24.

Although the embodiment of FIGS. 8—10 has been illustrated in simplified form, it will be understood that the details thereof can be quite similar to the details of the previously described embodiment. The main distinction, of course, between the embodiment of FIGS. 1 and 2 and that of FIGS. 8—10 is that in the former, the rocket means 70 is disposed within a sleeve of the pilot chute while in the latter, the rocket means is merely connected with the pilot chute by the line 200. However, in each instance, the pilot chute means aligns and orients the rocket means in a downstream direction and the rocket means then fires downstream to deploy the main canopy. The advantage of the arrangement of FIGS. 8—10 is that it can be used with any type of pilot chute means.

To elaborate somewhat further on the embodiment of FIGS. 8—10, the rocket means 70 can be of the type described in FIGS. 1 and 2, or alternatively, can be of the cluster type wherein a plurality of rocket motors are assembled together. In either instance, the rocket nozzles are preferably splayed outwardly in such a manner as to generate a thrust force along a longitudinal axis which, due to the action of the pilot chute, is oriented in a downstream direction. The rocket nozzles can also be canted in such a manner as to assure that spin will occur as the rockets are propelled downstream, in which event swivel connections must be provided between the lines 200 and 202 and the rocket means 70. Additionally, in those instances where it is desired to separate the rocket means and pilot chute from the main canopy just at or prior to inflation thereof, a release device such as 138 can be provided along the line 202, such release device being activatable by a centerline 156 so that the line 202 can be effectively severed at substantially the time when the main canopy and its lines are fully extended.

Although in the embodiments described thus far, no mention has been made of any reefing means for the main canopy 24, the inclusion of such a reefing means affords at least one advantageous feature. It must be remembered that, in use, the airspeeds encountered may often be about 300 knots or 500 feet per second. The effective pull of the rocket 72 is normally about 120 feet per second, and thus when the mouth of the main canopy 24 is not reefed, simple aerodynamic spreading of the main canopy may commence before the main canopy lines are fully stretched. In such a situation, the spreading or inflation of the main canopy may be asymmetrical and a small inflated "bubble" portion of the canopy will receive the full effect of the airstream, thus presenting a potentially dangerous condition wherein the "bubble" portion might burst. To prevent this type of asymmetrical inflation, it is considered advantageous and beneficial to incorporate some suitable form of reefing device which will keep the mouth of the main canopy reefed or strangled until the main canopy lines are fully stretched. At full line stretch, the reefing device can release the mouth of the main canopy to permit main canopy spreading or inflation in an orderly and symmetrical manner.

While any suitable type of reefing device can be used, one advantageous type is a fail-safe spreading gun of the type disclosed in U.S. Pat. No. 3,281,098, issued Oct. 25, 1966, to Fred B. Stencel et al. If reference is now made to FIGS. 11 and 12 hereof, such FIGS. show the FIG. 1 embodiment of the present invention with the main canopy 24 being provided with a reefing device in the form of such a spreading gun being generally designated 250. Rather than describe the gun 250 in any detail, it is considered sufficient to state that the same corresponds with the gun disclosed in aforementioned U.S. Pat. No. 3,281,098 and the teachings thereof are hereby incorporated herein by reference. In FIG. 11, the main canopy 24 has been extracted from its pack 26, and has assumed a belled out, semi-inflated configuration due to the provision of antisquidding lines 252. The center release line 156 described in connection with FIG. 1 includes a portion 156' which acts as the drogue line and a portion 156" which acts as a firing lanyard for the gun 250. The position of the apparatus in FIG. 11 is analogous to the position of the apparatus in FIG. 1 of said U.S. Pat. No. 3,281,098. In FIG. 12, which is analogous to FIG. 1A of said U.S. Pat. No. 3,281,098, the lines 252 have been released, the canopy 24 has streamed out as shown, the gun 250 has been fired and the pilot chute and rocket combination has been released from the main canopy by the release device 138. Since at this point the lines from the main canopy 24 have been fully stretched, the subsequent inflation of the main canopy will be orderly and symmetrical.

Referring now to a further embodiment of the present invention, shown in FIGS. 13, 14 and 15, there is shown therein a modified form of rocket generally designated 300 which includes an elongated tubular rocket body 302 having a cylindrical charge of propellant 304 disposed therewithin. The rocket body 302 is connected by a circular strip key 306 which connects the rear or tail portion 308 of the rocket member to the body. A sealing ring 310 can be provided between the forward portion of the rocket tail section 308 and the interior of the rocket body 302 to prevent escape of any pressure gases from within the rocket. The tail portion 308 includes a frustoconical tapering wall 312 through which are formed a plurality of outwardly directed rocket nozzles 314. If desired, seals 316 can be provided interiorly to close off such nozzles. The tail portion 308 is provided at its rear end with an internally threaded portion 318 which compatibly meshes with threads 320 at the forward end of a firing mechanism housing 322. An O-ring seal 324 is provided between the forward end of the firing mechanism housing and the interior shoulder within the rocket tail portion 308. Additionally, a spacer disc 326 having a central aperture 328 therein is interposed between the forward end of the firing mechanism housing and an internal shoulder 330 within the tail section 308. The tail section additionally includes an internal chamber 332 within which an explosive cartridge 334 is mounted, such cartridge being sealed against the wall of the chamber by an O-ring seal 336. Between the forward end of the cartridge 334 and the interior of the rocket itself, a through port 338 is provided so that the explosive charges from the cartridge 334 can be utilized to ignite the propellant 304 within the rocket.

Although the firing mechanism shown in FIG. 14 is generally analogous to the previously described firing mechanism, it will nevertheless be described in further detail hereinafter for purposes of completeness. The firing mechanism includes a cylindrical bore 340 within the interior of the firing mechanism housing 322. A striker member 342 is slidably positioned within such bore and includes a projecting head or tip portion 344 of a size and configuration to pass through the bore 328 in the spacer 326. A firing pin generally designated 346 includes an elongated shank portion 348 which fits within the striker member 342. The shank 348 is provided with an annular groove portion 350 which cooperates with a series of spherical-locking balls 352 which fit within openings 354 in the sides of the striker member 342. In this manner, when the firing mechanism is in the position shown in FIG. 14, the shank 348 of the firing pin and the striker member 344 are locked together through the locking action of the spherical balls 352 within the groove 350.

The firing pin 346 is also provided with an enlarged cylindrical head portion 356 having a further enlarged flange 358 at the end thereof and an eye 360 connected thereto. The firing mechanism housing 322 is also provided with three cylindrical bore portions 362, 364 and 366 which diminish in size from the rear end thereof toward the main central bore 340. As can be seen from FIG. 14 the shank 348 fits within the bore 366, the enlarged head 356 of the firing pin fits within the bore 364 and the enlarged flange 358 fits within the bore 362. A further sealing O-ring 368 can be provided at the shoulder formed at the innerface of the bore portions 362 and 364 for the purpose of sealing the interior of the firing mechanism before firing occurs. Finally, a coil compression spring 370 surrounds the shank 348 of the firing pin and reacts between the rear of the striker member 342 and the shoulder 372 formed at the intersection of the bore portions 366 and 340.

As the firing mechanism is shown in FIG. 14, the compression spring 370 urges the striker member 342 forward until its tip portion is disposed within the bore 328 of the spacer member, although such tip 344 terminates short of contact with the explosive cartridge 334. The engagement of the head 356 and the flange 358 on the firing pin with their respective shoulders within the firing mechanism housing prevents any further forward movement of the striker member, and the striker member cannot inadvertently be jarred forwardly because of the ball lock arrangement provided by the balls 352 and the locking groove 354 on the firing pin shank. When it is desired to operate the firing mechanism for igniting the rocket, however, in a process to be described in detail hereinafter, a rearward pull is applied to the eye 360 of the firing pin. When such pull overcomes the biasing force of the spring 370, the entire firing pin 346 is pulled rearwardly and the striker member 342 is likewise pulled rearwardly because it remains locked onto the firing pin by the balls 352. An annular groove 374 is provided in the firing mechanism body 322 along the bore 340. When the firing pin 346 moves far enough rearwardly so that the balls 352 are aligned with the groove 374, such balls will drop into the groove, thereby unlocking the striker member 372 from the shank 348 of the firing pin. At this point, the now compressed spring 370 will propel the striker member 342 forwardly until its tip portion 344 contacts and explodes the cartridge 334. The explosive forces from this cartridge will in turn be directed through the port 338 to ignite the propellant 304 within the rocket 300.

The "control means" of this embodiment is analogous to the control means in the embodiment of FIG. 1. As such, it includes a hollow flexible control sleeve 376 which is connected by a clamping bank 378 to the exterior of the firing mechanism housing 322 just above an outwardly projecting shoulder portion 380 thereof. From FIG. 15, it can be seen that a band 382 is connected with the opposite end of the control sleeve 376, such band terminating in an anchor line 384 having a ball 386 at the end thereof. The ball connects with a release means 388, shown in dotted lines connected with a parachute pack 390. The release means 388 is similar to the previously described release means 154. A combined firing and extraction lanyard assembly generally designated 392 is shown in FIG. 15, and such assembly includes a line or cable 394 having a loop portion 396 connected with the eye 360 of the firing pin. A slack line 398 is connected between the line 394 and the interior of the control sleeve 376, as shown in FIG. 14. The opposite end of the line 394 is connected with an override disconnect assembly shown in FIG. 15 and generally designated 400. Such assembly includes a pair of interlocking pins 402 and 404, the former having an outer eye portion 406 and the latter having an outer eye portion 408. The interlocking pins 402, 404 are housed within a cylinder 410 and are surrounded by a coil compression spring 412. The line 394 is connected at its opposite end to the eye portion 406 by a loop 414.

A strip of webbing 416 is connected intermediate its ends to the override disconnect 400 by means of clamping wires 418 or the like. One end of the webbing is provided with a loop 420 which connects with the loops 422 at the apex of the main canopy which is generally designated 424 and which is shown mounted within the parachute pack 390. The other end of the webbing 416 is connected with a loop 426 which acts as the convergence point for the lines 428 of an internal pilot parachute whose canopy is designated 430. This internal pilot chute is looped around the main canopy or main parachute 424 within the parachute pack. Additionally, a branch line 432 connects from the webbing 416, intermediate its ends, to the eye 408 on one of the override disconnect pins by means of a loop portion 434.

Before describing the operation of the present embodiment, let attention be directed to FIG. 13 which shows the forward end of the rocket wherein an end plug 440 is connected within the rocket body 302 by a strip key 442 and is sealed therewith by an O-ring 444. The plug 440 includes an eye portion 446 to which a lanyard 448 is connected by means of a loop 450. The plug 440 can be formed simply as a solid member with an eye 446 at the end thereof, if desired. Alternatively, as illustrated in FIG. 13, a line cutter can be incorporated for the purpose of releasing the pilot parachutes to be described shortly hereinafter. The line cutter includes a piston portion 452 housed within a recess 454 in the end plug, such piston portion carrying a knife blade 456 at the end thereof. O-ring seals 458 are provided between the piston and the bore 454 to assure that no pressure can escape therebetween. When the rocket is fired, the pressures generated through ignition of the rocket propellant 304 will drive the piston 452 forwardly thus causing the knife 456 to sever the loop 450 of the lanyard 448 which connects to the pilot parachutes to be now described.

The opposite end of the lanyard 448 connects by a loop portion 460 to a shear link assembly 462. In FIG. 13, a pair of pilot parachutes and their retaining pouches are illustrated. The low speed pilot parachute 464 is mounted within a pouch 466 and is connected by a line or lanyard 468 to a pin 470 forming a part of the shear link assembly 462, such connection being made by a loop portion 472 at the end of the lanyard 468. The high speed pilot parachute 474 is housed within a pouch 476 and is connected by a lanyard 478 to the shear link assembly by means of a loop portion 480 at the end of the lanyard which surrounds a pin 482 in the shear link. An additional line or cable 484 is connected between the low speed pilot chute lanyard 468 and the high-speed pilot chute pouch 476. Finally, a lanyard or web 486 which terminates in an end loop 488 is connected from the low speed pilot chute pouch 466 back to some convenient connection point, such as an ejection seat to be now described.

To understand the operation of the embodiment described in FIGS. 13, 14 and 15, attention is now directed to FIG. 16 which shows a typical operational sequence. It will be understood that all of the components described hereinabove, namely, the rocket, the firing mechanism, the control means, the override disconnect, the internal pilot chute, the high-speed and the low speed external pilot chutes and all of the various lanyards and so on are initially housed within the parachute pack 390, generally in a pocket separate from that which houses the main canopy 424. The parachute pack 390 is connected to the pilot or other occupant by means of any conventional form of harness. While the apparatus of this embodiment need not necessarily be utilized in conjunction with an ejection seat, it does operate particularly well with such an ejection seat and as part of an ejection escape apparatus, and accordingly, it will be seen that in FIG. 16A, an ejection seat 490 is illustrated. This ejection seat is provided advantageously with a seat stabilization apparatus 492 such as that disclosed in U.S. Pat. No. 3,103,331, issued Sept. 10, 1963 in the name of Fred B. Stencel or U.S. Pat. No. 3,387,803 issued June 11, 1968 in the name of T. S. Bradfield et al. As is conventional with ejection seats, a lap belt is provided to secure the occupant within the ejection seat until some predetermined time or signal, whereupon the lap belt is released to allow man-seat separation. Such a lap belt is designated 494 and is shown in FIG. 16A connected with the lanyard 486. In actual practice, the loop end 488 on the lanyard 486 can be connected in some fashion with the lap belt 494 when the pilot enters the aircraft and secures himself within the ejection seat by his lap belt.

In FIG. 16A, the seat 490 has been ejected from the aircraft within which it was initially mounted, the lap belt 494 has opened and man-seat separation has started to occur. For purposes of this discussion, it will be assumed that the ejection sequence shown in FIG. 16 occurs at low speed, or at least at some speed low enough where the high-speed pilot chute need not come into operation. As man-seat separation starts to occur, as in FIG. 16A, the stowage compartment in the parachute pack 390 opens, either by pressure against snaps or by some other expedient. Going now to FIG. 16B, the pulling on the lanyard 386 as the man and the seat 490 further separate relatively to one another causes the low speed pilot chute pouch 466, the high-speed pilot chute pouch 476, the rocket 300 and the control sleeve and its internal components to be extracted out of the compartment within the parachute pack 390. REferring back for a moment to FIG. 13, it will be seen that each of the pilot chute pouches is provided with a fold-over flap initially closed by snaps 496. Also a breakable tie cord 498 maintains the lanyard 448 slack and enables the rocket 300 to be quickly pulled from its stowage compartment. Since no part of the arrangement shown in FIG. 16B has been pulled taut, with the possible exception of the lanyard 486, the various components will be pulled from their stowage compartment within the parachute pack 390. However, once the control sleeve 376 has been extracted for a distance sufficient so that the control means is pulled taut, that is, until the anchor band 382 and the anchor line 384 are pulled taut, yet still gripped by the release means 388, no pilot chute opening occurs. When the control means is pulled taut, however, the tie cord 498 will break thereby allowing the lanyard 448 to pull taut. Assuming, as aforementioned, that the sequence being described is a low speed ejection, the force transmitted along the lanyard 468 to the low speed pilot chute will cause the snaps 496 to open, thus permitting the low speed pilot chute pouch 466 to be stripped away from the low speed pilot chute in the manner shown in FIG. 16C. At this point, the man and all equipment connected thereto is totally separated from the ejection seat 490, but the lanyard 486 and the low speed pilot chute pouch 466 remain connected with the seat. The low speed pilot chute canopy 466 has now entered the airstream in a proper orientation and direction along the trajectory path of the occupant and it starts to inflate. The control means is pulled taut by aerodynamic drag foreces and the rocket 300 is oriented in a downstream direction by the pilot chute 464, again along the trajectory followed by the pilot.

Referring now to FIG. 16D, the pilot chute 464 is fully inflated and the release means 388 has received its proper signal, either through an appropriate lapse of time or in response to some other condition. At any rate, the release means frees the control means, i.e. releases the ball 386 at the end of the cable 384 and this permits the aerodynamic drag forces to pull the sleeve 376 until the line portion 394 therein pulls taut, thereby causing the firing pin 346 to be pulled. When this occurs, the firing mechanism ignites the rocket in the manner previously described and in FIG. 16D, the rocket has just been ignited.

Going to FIG. 16E, the rocket has been propelled in a downstream direction and has overtaken and passed the low speed pilot chute 464. The override disconnect 400 and the internal pilot chute 430 are extracted from the parachute pack 390, as is the main canopy 424. If for some reason, such as an overside bail out, it is desired to utilize the internal pilot chute 430 for extracting the main canopy, then the override disconnect 400 releases the rocket and the external pilot chutes connected therewith by stripping away the cylinder 410 and hence permitting pins 404 and 402 to separate.

Finally, in FIG. 16F, the main canopy 424 has been fully extracted from the pack 390 and deployed into the airstream and the suspension lines 500 therefrom have been pulled taut or substantially taut. A reefing device 502, such as a fail-safe spreading gun similar to the previously described fail-safe spreading gun 250 in the embodiment of FIGS. 11 and 12, is employed and is operated by a centerline release 504. The burning time of the rocket 300 is correlated with the length of the centerline 504 so that the rocket 300 burns out at substantially the same time as the spreading gun 502 inflates the main canopy 424. If desired, a line cutter, not illustrated but similar to that described at 138 in FIG. 1 embodiment, can be employed to sever the loop 420 at substantially the time that the canopy inflates, thereby releasing the rocket and the pilot parachutes from connection with the main canopy 424.

In the event that the line cutter does operate at the apex of the main canopy, then the pilot chutes and the burned out rocket will be lowered to the ground by the low speed pilot chute 464 either alone or in cooperation with the internal pilot chute 430. Also, it will be recalled that in FIG. 16E, the propulsion of the rocket 300 in a downstream direction caused such rocket to overtake and pass the low speed pilot chute 464. If the line cutter 456 is utilized in the end of the rocket, however, such line cutter will sever the loop 450 and will thus separate the external pilot chutes from the rocket before the rocket ever has a chance to overtake such pilot chutes, thereby preventing the rocket from becoming fouled with the pilot chutes or from becoming misguided along its course. Finally, in the event that the ejection sequence takes place at high speed, rather than at low speed, the aerodynamic forces acting on the low speed pilot chute canopy 464 will be so great as to cause a shearing of the pin 470. This will cause the lanyards 468 and 484 to pull taut, thus stripping away the pouch 476 from the high-speed pilot chute canopy 474 which will then enter the airstream and inflate.

Referring now to FIG. 17, there is shown a further modified embodiment wherein the main canopy 424 is mounted within a deployment sleeve 510. The fail-safe spreading gun 502 is also mounted within the sleeve adjacent the open end 512 thereof, such open end being held substantially closed by a draw string 514. The centerline 504 which fires the spreading gun is maintained in a slack position and is connected with a shear link 516 which in turn connects along the line 416 to the override disconnect. The full control means and release means, rocket pilot chutes and the like have not been illustrated, but they are of can be of the type described in the FIGS. 13—15 embodiment.

Figure 18:
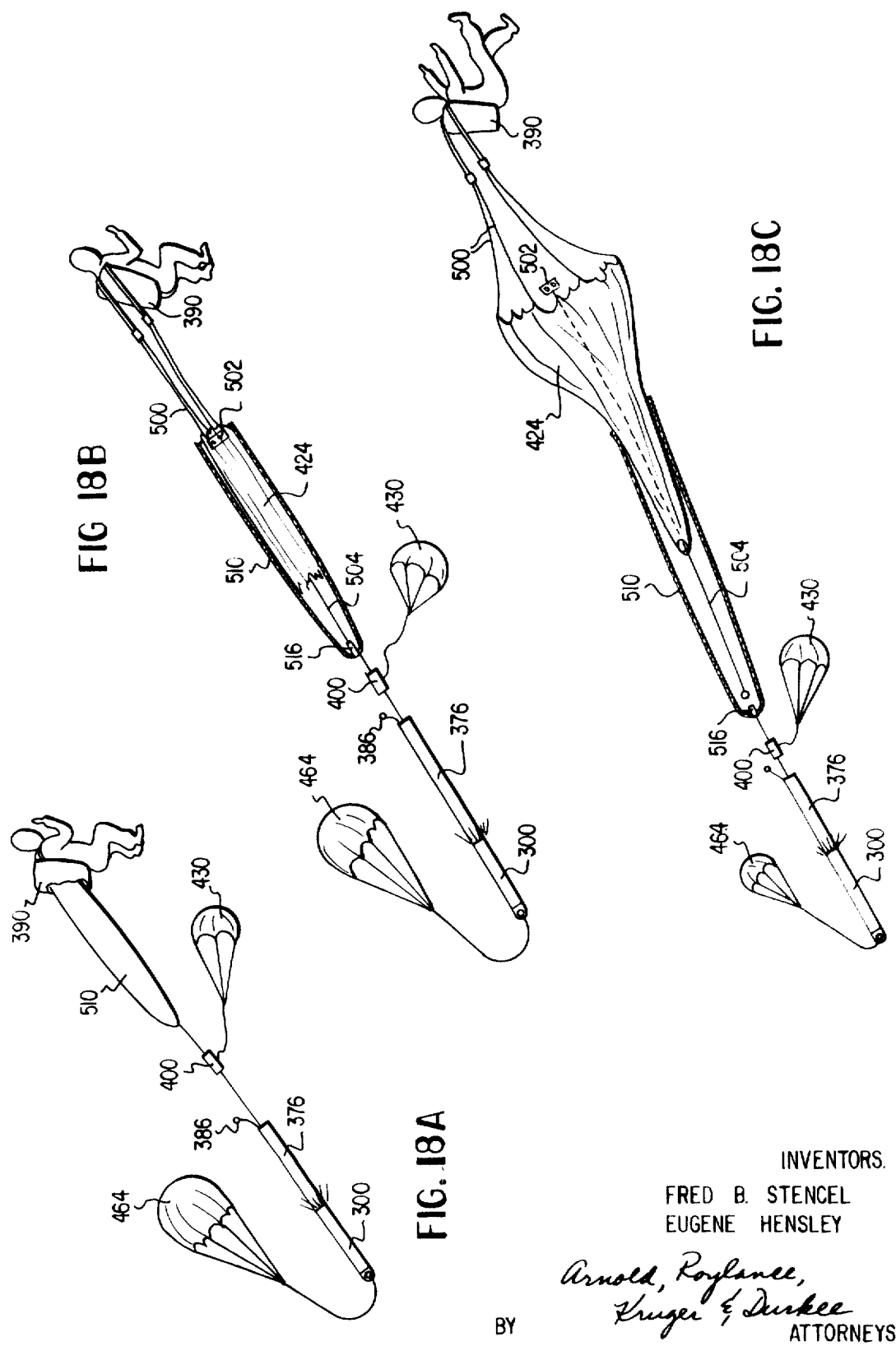

For an understanding of the operation of the embodiment described in FIG. 17, attention can be directed to FIG. 18A wherein, for purposes of simplicity, only a single pilot chute 464 is shown. In FIG. 18A, the control means has already been released by the release means, the rocket 300 has been ignited and is traversing downstream, the override disconnect and the internal pilot chute 430, if employed, has been pulled into the airstream and the deployment sleeve 510 with the main canopy disposed therewithin is being extracted out of the parachute pack 390. In FIG. 18B the deployment sleeve 510 has been fully pulled into the airstream, the draw string 514 has either been broken or pulled off of the open end 512 of the deployment sleeve and the suspension lines 500 have almost, but not quite, become fully stretched. At this point, the firing line 504 pulls taut, and, as shown in FIG. 18C this shears the link 516 and operates the spreading device 502 to commence canopy inflation. At this time, however, as shown in FIG. 18C, the canopy is not fully extracted from the deployment sleeve which is just starting to be pulled away therefrom by the rocket. That is, after the link 516 shears, the rocket starts to tow away the deployment sleeve 510, thus stripping the same away from the main canopy 424, the lower portion of which is now starting to spread. The purpose for using a deployment sleeve of this type and an embodiment of the variety shown in FIGS. 17 and 18 is to prevent momentum problems or damping problems which could occur if both the canopy 424 and the suspension lines were pulled completely taut. Additionally, as shown in FIG. 18C, the main canopy starts to inflate at the mouth thereof while the apex thereof is still maintained within the deployment sleeve 510. This prevents an immediate influx of air into the main canopy which could transmit shock forces to the pilot or which, under extreme conditions, might even cause an air bubble which could damage or burst the main canopy. However, through the utilization of a deployment sleeve, the inflation of the main canopy is gradual, the entrapped air at the mouth thereof serves to assist inflation of the main canopy in a slow timed manner and, in general, the inflation of the main canopy 424 is accomplished in a relatively gradual, rather than immediate, fashion.

Referring now to FIG. 19, there is shown a modification which is used to prevent the momentum created when the main canopy is extracted at high speed from reefing the spreading action by the spreading gun. In FIG. 19, the main canopy 424 is reefed by a spreading gun or other reefing device 502, but instead of being connected to the apex of the main canopy, the extraction lanyard, designated 520, is connected to a connecting link 522 which acts as the convergence point for a series of tapes 524 connected to the main canopy between the apex and the terminus of the skirt thereof. It will, in fact, be noted that the apex of the main canopy and the whole upper portion of the canopy is reversed, as illustrated at 526 to thus provide a sort of reverse bell-shaped configuration against which the rocket pulls. In this manner, the main canopy 424, instead of being extracted as an elongated mass, is extracted in the bell-shaped configuration shown in FIG. 19 wherein the spreading gun 502 can readily inflate the canopy at the desired time, regardless of the momentum occasioned by high-speed operation.

Referring now to FIGS. 20 and 21, there is shown a further modification of the present invention which incorporates a release means for the pilot parachute after the rocket has been fired. Utilizing for this embodiment, the same reference numerals as used in FIG. 14, wherever applicable, it will be seen that the rocket 300, its tail section 308, the firing mechanism housing 322, and in general, the same firing mechanism 346 are all utilized. The firing mechanism housing 332 is, however, modified to the extent that the same is provided with a series of radial apertures 530 communicating with the internal bore 364 within which the plug or head portion 356 of the firing pin is disposed.

The entire firing mechanism and its housing 322 are lodged slidably within a rocket retension housing generally designated 532 which includes a cylindrical body 534 having an internal cylindrical bore 536 within which the firing mechanism housing 322 is disposed. Adjacent the rear end of the housing, an internal annular groove 538 communicates with the internal bore 536. A series of spherical-locking balls 540 interfit between the apertures 530 in the firing mechanism housing and the annular locking groove 538 in the rocket retention housing. As a result, before the firing pin is pulled, as shown in FIG. 20, the locking balls 540 securely lock the firing mechanism and the rocket 300 attached thereto within the rocket retention housing 534.

It will also be seen that the rocket retention housing 534 includes an annular flange 542 either integral with the housing or fixedly attached thereto. Upon this annular flange 542, there is provided a series of forwardly directed pins 544 extending axially of the bore 536 through the rocket retention housing. A slidable disc 546 is also provided, such disc having an internal central aperture 548 whose size slightly exceeds the external diameter of the rocket retention housing 534, in a manner which enables the disc 546 to be slidably disposed about the exterior of the rocket retention housing. An annular locking groove 550 is formed about the circumference of the aperture 548 and such locking groove is adapted to align with a circumferentially disposed series of holes or apertures 552 provided in the rocket retention housing body 534.

A series of locking balls 554 are interposed in the holes 552 and locked into the locking groove 550, such balls being held in place by the exterior surface of the firing mechanism housing 322, as shown in FIG. 20. The rear surface of the disc 546 is provided with a series of pockets 556, each adapted to receive the tip of a pin 554 so long as the disc 546 is properly locked in position. Suspension lines 558 from the pilot chute means of the type previously described terminate in open loop ends 560 which are designed to fit over the pins 544 in the manner shown in FIG. 20.

It will thus be appreciated that when the mechanism is shown in the position of FIG. 20, the firing mechanism 322 attached to the rocket 300 is locked within position inside the rocket retention housing 534 by means of the locking balls 540. While in this position, the exterior surface of the firing mechanism housing 322 also serves to keep the locking balls 554 in position which thus serves to keep the disc 546 locked in a position where the pins 544 are engaged within the pockets 556. This means that when the open loop portions 560 from the pilot chute suspension lines 558 re trained over the pins 544, in the manner shown in FIG. 20, such suspension lines are locked in position and all aerodynamic forces transmitted therealong terminate at the loop ends 560. Assuming now that the device has gone through a sufficient sequence of operations so that the control means has been released by the release means, thus causing the firing lanyard to pull the firing pin 346, such pulling of the firing pin will ignite the rocket in the manner previously described and will additionally extract the firing pin itself from the firing mechanism. As such firing pin extraction occurs, as shown in FIG. 21, the locking balls 540 will be released thereby unlocking the firing mechanism housing 322 and the attached rocket from interconnection with the rocket retention housing 534. Since the rocket having thus been ignited will be propelled forwardly, the entire rocket and attached firing mechanism housing will move forwardly, as shown in FIG. 21. As the firing mechanism housing is withdrawn forwardly from the rocket retention housing 534, the locking balls 550 will be released to drop inwardly, and this will unlock the disc 546 from its interengagement with the housing 534. Continued aerodynamic pull on the pilot chute suspension lines 558 will thus cause the disc 546 to slide somewhat forwardly, as shown in FIG. 21 until the tips of the pins 544 are released from the pockets 556. At this point, the loop ends 560 on the suspension lines can fly freely off the pins 544 and the drag forces from the pilot chute will be released.

It will be understood, of course, that the modification described in FIGS. 20 and 21 can be used in conjunction with the pilot chutes and control means thus far described, and, in fact, the control means itself will be identical, the control sleeve having its forward end attached to the rocket retention housing 534 in some suitable manner as for example through the use of the same type of spring clamp or clamp band 378 as described in FIG. 14. This means that the rocket retention housing and firing mechanism combination described in FIGS. 20 and 21 can be used with equal facility in place of those described in connection with FIGS. 1 and 2.

Another embodiment of interest where the firing mechanism and rocket retention housing arrangement of FIGS. 20 and 21 can be used is that shown in FIGS. 22 and 23. The canopy of the pilot parachute in this instance is designated 560 and it will be seen that the suspension lines 558 therefrom trail back and lock to the rocket retention housing in the manner shown in FIG. 20 and described in connection therewith. A central sleeve 562 of the general type previously described in the FIG. 1 embodiment extends from the apex of the canopy 560 and locks by a locking band 564 to the forward end of the rocket retention housing. The control sleeve 376 is connected by a locking band 378 to the rear end of the rocket retention housing. The firing lanyard in this instance is designated 566 and it connects by an open loop end 568 to the eye 360 of the firing pin. The firing lanyard 566 is maintained in a slack condition within the control sleeve 376 with the slack portion being designated 566S, such portion having a length exceeding the length of the rocket guide sleeve 562. A breakable tie cord 570 maintains the lanyard 566 in its slack condition, and in such condition, an auxiliary band or web 572 connects between the lanyard 566 an the control sleeve 376.

The tie cord 570 is of a type which will withstand breaking under the force that pulls the firing pin, but which will break under the thrust force generated by firing of the rocket. A 100-pound tie cord has been found suitable for this purpose and such tie cord is, of course, the type which will withstand any pull up to 100 pounds, but will break when a force in excess of 100 pounds is applied thereto.

Although no release means has been illustrated in FIG. 22, it will, of course, be understood that the usual release means 388 is utilized and that when the parts are in the position shown in FIG. 22, the control means has not yet been released by the release means. Moving now to FIG. 23, however, the control means has been released by the release means whereupon the aerodynamic drag forces from the pilot chute 560 will be transmitted to and along the firing lanyard 566. After this lanyard pulls taut, the firing pin is extracted through a pulling force exerted on the eye 360 thereof. If the arrangement were exactly like that shown in FIGS. 20 and 21, the rocket would simply fire up the tube and be completely freed from connection with the lanyard 566. However, as shown in FIG. 22, a separate end cap housing 574 has been threaded onto the rear end of the firing mechanism housing 322. An aperture 576 is formed centrally therethrough to permit passage of the lanyard 566. The opening 576 is not large enough to permit passage of the firing pin, however, and its size is expressly smaller than the flange portion 358 on the firing pin. As a result, although the firing pin can be pulled to thus ignite the rocket, it cannot be extracted from the end cap housing 574.

In the manner previously described, it will be appreciated that pulling of the firing pin will cause the rocket 300 to ignite and thereby commence travel up the guide tube 562 through the pilot chute 560. As the thrust from the firing mechanism is transmitted to the end cap housing 574 and hence to the firing pin and the lanyard 566 connected therewith, the tie 570 breaks and the slack portion 566S of the lanyard starts feeding up through the guide tube. It will, however, be remembered that the length of this slack portion was somewhat longer than the length of the guide sleeve 562, and as a result, the lanyard will not be pulled taut until after the rocket has cleared the guide sleeve and traversed into space in the manner shown in FIG. 23. At this point, the lanyard 566 will be pulled entirely taut and its force will be applied to the apex 422 of the main canopy 424 to thus commence extraction thereof out of the parachute pack. The strip or webbing 572 serves to assure that the control sleeve 376 is held back in a generally linear position as shown in FIG. 23. Since the pilot chute suspension lines 558 have been released, the aerodynamic drag forces therefrom are released and the rocket 300, which is now oriented downstream, serves to provide the extraction and deployment force for the main canopy 424.

Finally, if attention is directed to FIGS. 24—27, the effect of the rocket material and nozzle configuration will be discussed. In FIG. 24, a fragmentary view of the rocket shows that a typical nozzle 314 thereof has a diameter of X. The time-thrust curve for such a nozzle, if made of conventional materials, is shown in FIG. 26, from which it can be seen that from zero thrust, the thrust increases gradually to a maximum, then drops off sharply. It has been found, however, that through the utilization of controlled erosion of the nozzles, the time-thrust curve can be adjusted from that shown in FIG. 26 to the type shown in FIG. 27 wherein the thrust level is rapidly reached and is maintained almost linearly throughout the course of the rocket firing. To accomplish such a controlled erosion to give the curve shown in FIG. 27, the material of the wall 312 wherein the nozzles 314 are formed is of a type which erodes away as the propellant within the nozzle burns. In particular, sulfur-bearing steels have been useful for this purpose, and one specifically useful steel material is a high sulfur chromemoly steel manufactured by Allegheny-Ludlum Corporation under the style designation ETD-150. This particular steel erodes away as the rocket burns, thereby increasing the size or expansion ratio of the nozzle which in turn lowers the pressure inside the rocket motor and this lowering of pressure, in turn, attenuates the burning rate of the propellant fuel. In FIG. 25, the erosion of the material from which the rocket tail section is fabricated has caused the size of the rocket nozzle to increase from an initial diameter of X to a larger diameter of Y. This larger diameter of Y causes a nozzle 314' to have a size which is somewhat larger than the initial nozzle 314 and which thus necessarily permits a greater pressure release from within the nozzle. As the propellant within the rocket burns, the nozzle size gradually increases from X to Y and this gradual increase thus gives a gradual pressure decrease inside the rocket, thereby permitting the flat time-thrust curve of FIG. 27 to be accomplished.

Referring finally to FIGS. 28 and 29, two modified forms of override disconnect assemblies are illustrated. Both of these modified assemblies differ from the previously described assembly 400 in that operation of the rocket and external pilot chute will release the internal pilot chute, and vice versa. In the modified assembly 400' shown in FIG. 28, a housing 590 is provided with a central open portion 592 within which a lever 594 is pivotally mounted by means of a central pivot 596. The lever 594 is pivotally connected at each of its ends to a pair of interlocking pins 598, 600 which extend through bores 602 in the housing 590. Thus, a pivot pin 604 connects between each end of the lever 594 and a pin 598. The ends of the pins 600 extend above the housing 590 and are provided with holes 606 through which lines 608 and 610 respectively extend. The line 608 connects to the rocket and external pilot chute while the line 610 connects to the internal pilot chute. Biasing means, such as springs 612 disposed on opposite sides of the central pivot 596 keep the lever 594 in its centered or "neutral" position. At the lower end of the housing 590, a slot 614 is provided for accommodating a strip of webbing 616 which connects to the apex of the main canopy.

It will be understood that while the assembly 400' is not being subjected to any forces from either the internal or the external pilot chute, the parts are in the position shown in FIG. 28 with the interface between each set of interlocking pins 598, 600 being positioned within the bore 602. As such, the pins cannot unlock from one another. In the normal operational sequence, the rocket and external pilot chute will be operated to exert a pull on the line 608. Such pull will be exerted through the pins 598, 600 connected to the line 608 and will hence rotate the lever 594 clockwise in the orientation of FIG. 28. This rotation of the lever 594 about its central pivot 596 will lower the interlocking pins 598, 600 associated with the internal pilot chute line 610 until the interface between such pins enters the open portion 592 of the housing. At this time, the interface is unrestrained by the bore 602 and the pin 600 and line 610 are thus released from attachment to the housing 590, thereby disconnecting the internal pilot chute from the system. However, due to the fact that the interlocking pin interface is located near the bottom of the bore 602, the interface for the pins associated with line 608 will still be restrained within the bore 602. In other words, as the lever 594 rotates, the downwardly moving pin interface will enter the open portion 592 of the housing before the upwardly moving pin interface clears the top of the housing. Naturally, in the case of overside bailout where the internal pilot chute is deployed first and the pull is exerted on the line 610, then the lever 594 will be rotated counterclockwise and the line 608 will be released, thus releasing the rocket and external pilot chute.

In FIG. 29, the override disconnect assembly 400" includes a housing 620 having a triangularly shaped lever or member 622 pivotally mounted near its apex by a pivot pin 624. Leaf type springs 626 abut against opposite sides of the member 622 to keep the same in a centered or "neutral" position. Each lower corner of the member 622 is notched at 628 to permit passage of lines 630, 632 which connect respectively to the external pilot chute-rocket combination and to the internal pilot chute. Each line terminates in a ball end 634 which bears against the bottom of the member 622 but which is too large to fit through the notch 628. The housing 620 has a central open portion 636 and an upper arcuate open portion formed by curved walls 638, the curvature of which is a locus generated by the lower end corner of the member 622, as such member rotates. Stops 640 are provided at the top of the walls 638. At the lower end of the housing 620, a slot 642 is provided for accommodating a strip of webbing 644 which connects to the apex of the main canopy.

So long as the member 622 remains in the position shown in FIG. 28, both the line 630 and the line 632 are connected to the housing 620. In the event of an overside bailout, however, the internal pilot chute would exert a pull on the line 632 thus rotating the member 622 to the position shown in dotted lines. In such position, the corner notch 628 within which the line 630 is engaged lowers into the open portion 636, thus freeing the ball 634 and the line 630 attached thereto. This, of course, releases the rocket and the external pilot chute. In the event of rocket firing, the pull would be exerted on the line 630, the member 622 would be rotated in the opposite direction, and the line 632 to the internal pilot chute would be released.

After reading the foregoing detailed description, it should be apparent that the objects set forth at the outset of the specification have been successfully achieved by the present invention. Accordingly,

We claim:

1. A parachute deployment system comprising:
  a parachute including a main canopy;
  pilot parachute means including at least one pilot canopy;
  rocket means connected between said parachute and said pilot parachute means;
  means for deploying said pilot canopy into the airstream in a downstream direction and permitting said pilot canopy to inflate in the airstream;
  said pilot canopy exerting aerodynamic drag forces on said rocket means to move said rocket means into the airstream and to orient said rocket means in a downstream direction within said airstream;
  control means which permits said rocket means to be oriented in said airstream but which prevents said rocket means from igniting;
  said control means further serving to prevent said aerodynamic drag forces from said pilot canopy from being transmitted to said parachute, thus preventing deployment of said parachute; and
  release means operative in response to a predetermined condition which occurs after said rocket means has been oriented in the airstream;
  said release means operation serving to release said control means whereupon said rocket means is ignited and propelled in a downstream direction in said airstream;
  said rocket means downstream propulsion being transmitted to said parachute to hence deploy said parachute in said downstream direction.

2. A parachute deployment system as defined in claim 1 wherein said rocket means is activated and ignited by means of a firing mechanism which includes a retractable firing pin.

3. A parachute deployment system as defined in claim 2 further including an elongated firing lanyard connected to said firing pin and connected at least operatively to said main canopy.

4. A parachute deployment system as defined in claim 3 wherein said control means includes an elongated control sleeve and a member which connects between said control sleeve and said release means, said member, while engaged with said release means, serving to keep said control sleeve in at least a partially slack condition.

5. A parachute deployment system as defined in claim 4 wherein said firing lanyard is disposed within said control sleeve so that so long as said member remains engaged with said release means, said control sleeve and said firing lanyard will be at least partially slack and the aerodynamic forces from said pilot canopy will be transmitted through said member to said release means and will not be exerted upon said firing lanyard; said operation of said release means freeing said member so that said aerodynamic drag forces from said pilot canopy will be transmitted to said control sleeve to pull said control sleeve and thus pull said firing lanyard taut, whereupon said firing lanyard pulls said firing pin to ignite said rocket.

6. A parachute deployment system as defined in claim 5 further including a parachute pack within which said parachute is housed prior to deployment.

7. A parachute deployment system as defined in claim 6 further including housing means in which said rocket means is normally disposed and releasable locking means normally preventing separation of said rocket means from said housing means, said locking means being released when said firing lanyard pulls said firing pin to subsequently enable said rocket means to be propelled away from said housing means.

8. A parachute deployment system as defined in claim 1 wherein said rocket means includes exhaust nozzle means fabricated of a material which erodes as the propellent within said rocket means burns, said erosion facilitating control of the thrust generated by said rocket means.

9. A parachute deployment system as defined in claim 6 wherein said pilot canopy includes a plurality of suspension lines converging in an upstream direction to keep said pilot canopy inflated and wherein said suspension lines are released simultaneously with ignition of said rocket means to thus substantially eliminate aerodynamic drag forces from said pilot canopy.

10. A parachute deployment system as defined in claim 6 further including rocket support means normally supporting said rocket means and a guide sleeve extending between said pilot canopy and said rocket support means in surrounding relation to said rocket means, said guide sleeve serving to guide said rocket means after it is ignited to assure that its propulsion is directed downstream.

11. A parachute deployment system as defined in claim 10 wherein said pilot canopy has a central opening formed therein at the end of said guide sleeve and wherein tow cable means are provided between said rocket means and said support means, said tow cable means including at least one cable having one end attached to said rocket support means, a portion of said cable extending along the outside of said guide sleeve, a portion of said cable extending through said guide sleeve in the vicinity of said pilot canopy, a further portion of said cable extending along the inside of said guide sleeve, and the other end portion of said cable being attached to said rocket means.

12. A parachute deployment system as defined in claim 6 wherein said firing lanyard is at least operatively connected to the apex of said main canopy and wherein said parachute further includes a plurality of suspension lines connected between said main canopy and the load to be aerially lowered by said parachute.

13. A parachute deployment system as defined in claim 12 wherein severing means are provided adjacent said main canopy apex to sever said lanyard just prior to full deployment of said parachute to thereby separate said rocket means and pilot parachute means from said canopy as the same is deployed downstream.

14. A parachute deployment system as defined in claim 6 wherein said pilot parachute means includes a high-speed pilot canopy and a low speed pilot canopy.

15. A parachute deployment system as defined in claim 14 wherein each pilot canopy is initially housed within a pouch and wherein the low speed pilot canopy pouch is connectable to an object movable relatively to the load to be aerially lowered by said parachute, thus providing said means for deploying the low speed canopy as said load moves relatively to said object.

16. A parachute deployment system as defined in claim 15 further including a shear link assembly having at least three connection points thereon, said high-speed pilot canopy being attached to a first connection point, said low speed pilot canopy being attached to a second connection point, and a lanyard being attached between the nose of said rocket means and a third connection point.

17. A parachute deployment system as defined in claim 16 further including a line connected between said low speed pilot parachute and the pouch for said high-speed pilot canopy whereby if the airspeed at canopy deployment is of a predetermined magnitude, the aerodynamic forces on said low speed pilot canopy will shear said shear link assembly at said first connection point and said low speed pilot parachute will be released, said release of said low speed pilot parachute causing said line to strip the pouch from said high-speed pilot canopy to deploy said high speed pilot canopy into the airstream.

18. A parachute deployment system as defined in claim 6 wherein said parachute pack includes a receptacle which houses said rocket means and said pilot parachute means prior to deployment thereof.

19. A parachute deployment system as defined in claim 18 further including a lanyard operatively connected between the nose of said rocket means and said pilot parachute means.

20. A parachute deployment system as defined in claim 19 including a cutter device mounted at the nose of said rocket means operative upon ignition of said rocket means to sever said lanyard and thus disconnect said pilot parachute means from said rocket means.

21. A parachute deployment system as defined in claim 6 further including an override disconnect assembly attached between said firing lanyard and the apex of said main canopy, and an internal drogue parachute connected with said override disconnect assembly.

22. A parachute deployment system as defined in claim 21 wherein said override disconnect assembly includes:
 a housing having a central open portion and connecting means attached to said apex of said main canopy;
 a pair of spaced bores communicating with said central open portion;
 a first pair of interlocking pins positioned within one bore and a second pair of interlocking pins positioned within said other bore;
 a lever centrally pivotally mounted within said open portion, sad lever having one end pivotally connected to one pin of said first pair and having its other end pivotally connected to one pin of said second pair;
 said other pin of said first pair being connected to said rocket means and pilot parachute means;
 said other pin of said second pair being connected to said internal drogue parachute;
 deployment of said pilot parachute means exerting a force on said first pair to rotate said lever until said second pair enter at least partially into said central open portion and separate whereupon said internal drogue parachute is released;
 deployment of said internal drogue parachute exerting a force on said second pair to rotate said lever until said first pair enter at least partially into said central open portion and separate whereupon said rocket means and said pilot parachute means are released.

23. A parachute deployment system as defined in claim 6 further including a deployment sleeve within which said parachute is disposed, and a ballistic spreading gun which reefs the main canopy until the suspension lines thereof are substantially fully stretched.

24. A parachute deployment system as defined in claim 23 wherein said deployment sleeve has a substantially closed end and a fully open end, said main canopy apex being disposed adjacent said substantially closed end and said ballistic spreading gun being disposed adjacent said fully open end, said fully open end being initially held closed by a draw string.

25. A parachute deployment system as defined in claim 24 wherein a shear link is mounted within said deployment sleeve and connected to said rocket means, and wherein a normally slack line is connected between said shear link and said ballistic spreading gun.

26. A parachute deployment system as defined in claim 25 wherein ignition and propulsion of said rocket means strips off said draw string and permits said parachute suspension lines to be substantially fully stretched, said stretching of said suspension lines causing said slack line to pull taut thus shearing said link and activating said spreading gun, continued flight of said rocket thus stripping said deployment sleeve off of said main canopy.

27. A parachute deployment system as defined in claim 6 further including a ballistic spreading device which reefs the main canopy, a series of tapes spaced circumferentially about the main canopy between the apex thereof and the spreading gun, said tapes converging toward said rocket means and being connected at least operatively with said firing lanyard.

28. A parachute deployment system as defined in claim 7 wherein said rocket means includes exhaust nozzle means and wherein tie lines connect between said nozzle means and said housing means, said tielines being separated when said rocket means is ignited, but remaining intact in case of malfunction of said rocket means to keep said rocket means attached to said housing means.

29. A parachute deployment system as defined in claim 10 wherein the amount of firing lanyard slack within said control sleeve exceeds the length of said guide sleeve and wherein said slack is maintained in said firing lanyard by means of a breakable tie cord, said breakable tie cord being of a strength sufficient to withstand breakage under the aerodynamic drag forces of said pilot canopy so that said tie cord remains intact while said firing lanyard pulls said firing pin, said propulsive forces from said rocket means being sufficient to break said tie cord after said rocket means is ignited wherein said slack in said lanyard will pull taut, but not until said rocket means has cleared said guide sleeve.

30. A parachute deployment system as defined in claim 12 including reefing means for reefing said main canopy until said parachute suspension lines are substantially fully stretched by deployment of said parachute 31. A parachute deployment system as defined in claim 30 wherein said reefing means comprises a ballistic spreading gun which is activated substantially simultaneously with full stretch of said parachute suspension lines to spread said main canopy rapidly and symmetrically.

32. A parachute deployment system as defined in claim 19 further including a breakable tieline connected between the nose of said rocket means and said pilot parachute means, said tieline having a length considerably shorter than that of said lanyard to thus assure that said lanyard remains slack as said rocket means is extracted from said receptacle, said tieline being broken by the pull exerted thereupon by said pilot parachute means.

33. A parachute deployment system as defined in claim 21 wherein said override disconnect assembly includes:
   a housing having a central open portion and connecting means attached to said apex of said main canopy;
   a triangular member pivotally mounted near its top and having notched corners;
   said triangular member being disposed in said housing so that its bottom edge ordinarily lies above said central open portion;
   a first line connected to said pilot parachute means and said rocket means and a second line connected to said internal drogue parachute;
   one of said lines extending through each of the notched corners of said triangular member, with each line terminating in an enlarged end which cannot pull through said notched corner;
   said housing having an upper open area within which said triangular member is mounted, said upper open area having arcuate walls whose curvature is the locus generated by movement of the lower corners of said triangular member as said member rotates;
   deployment of said pilot parachute means exerting a force on said first line to rotate said triangular member until the lower corner in which said second line is engaged enters at least partially into said central open area whereupon said second line and hence said internal drogue parachute is released;
   deployment of said internal drogue parachute exerting a force on said second line to rotate said triangular member until the lower corner in which said first line is engaged enters at least partially into said central open area whereupon said first line and hence said pilot parachute means and rocket means are released.

34. In a parachute deployment system which includes a rocket connected to a main parachute and a pilot parachute connected to the rocket, the improvement comprising:
   a firing lanyard for igniting said rocket at some time after said pilot parachute has deployed said rocket into the airstream in a downstream direction;
   control means disposed between said rocket and said main parachute;
   said control means preventing aerodynamic drag forces of said pilot parachute from acting upon said firing lanyard to pull said lanyard taut; and
   release means operative at a preselected condition to release said control means whereupon said aerodynamic drag forces of said pilot parachute are transmitted to said firing lanyard to pull said lanyard taut and thereby ignite said rocket.

35. The improvement defined in claim 34 wherein said control means includes an elongated flexible sleeve within which said firing lanyard is disposed, an anchor band attached to said sleeve, and a ball at the end of said anchor band, said ball normally being connected with said release means whereupon said sleeve is maintained at least partially slack, said ball being released when said release means operates whereupon said firing lanyard within said sleeve can be pulled taut.

36. The improvement defined in claim 34 further including a supporting housing for said rocket, said control means including an elongated flexible sleeve surrounding said firing lanyard with one end of said sleeve being connected to said supporting housing.

37. The improvement defined in claim 36 wherein at least one auxiliary line connects said firing lanyard with said flexible sleeve.

38. In a parachute deployment system including a pilot parachute having a canopy and a spaced series of lines extending from the skirt of said canopy, and a rocket which is deployed and oriented in the airstream by said pilot parachute, the improvement comprising:
   a retention housing upon which said rocket is mounted prior to ignition thereof;
   means connecting said pilot parachute lines to said retention housing;
   said means being released when said rocket is ignited so that aerodynamic drag forces from said pilot canopy are substantially eliminated;
   said rocket including firing mechanism having a retractable firing pin;
   releasable locking means between said rocket and said retention housing, said locking means being released when said firing pin is retracted;
   said means connecting said pilot parachute lines including links to which said lines are connected, said links being connected with each other by an elongated cord, said cord being coiled at least partially about said firing pin and being released when said firing pin is retracted and then released.

39. In a parachute deployment system including a pilot parachute having a canopy and a spaced series of lines extending from the skirt of said canopy, and a rocket which is deployed and oriented in the airstream by said pilot parachute, the improvement comprising:
   a retention housing upon which said rocket is mounted prior to ignition thereof; and
   means connecting said pilot parachute lines to said retention housing;
   said means being released when said rocket is ignited so that aerodynamic drag forces from said pilot canopy are substantially eliminated;
   said means connecting said pilot parachute lines including:
   a flange on said retention housing;
   pins mounted on said flange and extending axially of said rocket, said pilot parachute lines being connected to said pins;
   a plate movable between a first position where it is engaged with said pins to keep said lines connected to said pins, and a second position where it is spaced away from said pins to permit said lines to disconnect from said pins; and
   coupling means normally maintaining said plate in said first position, said coupling means being releasable to permit said plate to move to said second position.

40. The improvement defined in claim 39 wherein said coupling means includes aperture means in said retention housing and ball means positioned within said aperture means and engaged between said rocket and ball recess means in said plate, said ball means being released when said rocket is ignited to thus free said plate for movement to said second position.